United States Patent [19]

Starke, Sr. et al.

[11] Patent Number: 5,816,700
[45] Date of Patent: Oct. 6, 1998

[54] PROCESS AND APPARATUS FOR MECHANICALLY MIXING POLYMERS AND LOWER VISCOSITY FLUIDS

[75] Inventors: Charles Wesley Starke, Sr., Richmond, Va.; Don Mayo Coates, Santa Fe, N. Mex.; Tom E. Estep, Chesterfield, Va.; Arthur William Etchells, III, Philadelphia, Pa.; Ashok H. Shah, Chesterfield, Va.; Edgar W. Slocum, Wilmington, Del.

[73] Assignee: E. I. du Pont de Nemours and Company, Wilmington, Del.

[21] Appl. No.: 735,546

[22] Filed: Oct. 23, 1996

Related U.S. Application Data

[60] Provisional application No. 60/005,875 Oct. 26, 1995.
[51] Int. Cl.$^6$ .............................. B01F 3/10; B01F 13/06; B01F 15/06
[52] U.S. Cl. .................. 366/147; 366/167.1; 366/172.1; 366/182.1; 264/40.6; 264/319; 425/209; 425/207
[58] Field of Search .............................. 366/162.1, 167.1, 366/168.1, 182.1, 182.2, 182.3, 273, 147, 172.1, 172.2; 264/14, 40.6, 70, 211, 319, 349; 425/207, 209, 200

[56] References Cited

U.S. PATENT DOCUMENTS

| | | | |
|---|---|---|---|
| 3,081,519 | 3/1963 | Blades et al. | 28/81 |
| 3,160,688 | 12/1964 | Aykanian et al. | 264/53 |
| 3,199,147 | 8/1965 | Aykanian et al. | 425/380 |
| 3,227,794 | 1/1966 | Anderson et al. | 264/205 |
| 3,484,899 | 12/1969 | Smith | 425/171 |
| 3,889,931 | 6/1975 | Adams | 366/264 |
| 4,054,625 | 10/1977 | Kozlowski et al. | 264/13 |
| 4,066,246 | 1/1978 | Korstvedt | 366/293 |
| 5,028,141 | 7/1991 | Stiegelmann | 366/245 |
| 5,178,461 | 1/1993 | Taniguchi | 366/322 |
| 5,192,468 | 3/1993 | Coates et al. | 264/13 |
| 5,215,764 | 6/1993 | Davis et al. | 425/208 |
| 5,470,150 | 11/1995 | Pardikes | 366/162.1 |
| 5,480,597 | 1/1996 | Ishida et al. | 366/162.1 |

FOREIGN PATENT DOCUMENTS 0 351 693 A2  7/1989  European Pat. Off. .

*Primary Examiner*—Tony G. Soohoo

[57] ABSTRACT

A mixing apparatus for continuously generating a homogeneous mixture of a polymer and a less viscous fluid is provided. The mixer includes means for continuously injecting a viscous polymer into a pressure vessel; means for continuously injecting a lower viscosity fluid into the pressure vessel; means for continuously injecting a plasticizing agent into the viscous polymer entering the pressure vessel; high shear centrifugal mixing means within the pressure vessel for mixing the polymer and the less viscous fluid; drive means for rotating the rotational mixing means; heating means for maintaining the temperature of the substances being mixed in the pressure vessel at a desired mixing temperature; and means for continuously discharging a homogeneous mixture of the polymer, the plasticizing agent, and the less viscous fluid from the mixer.

20 Claims, 9 Drawing Sheets

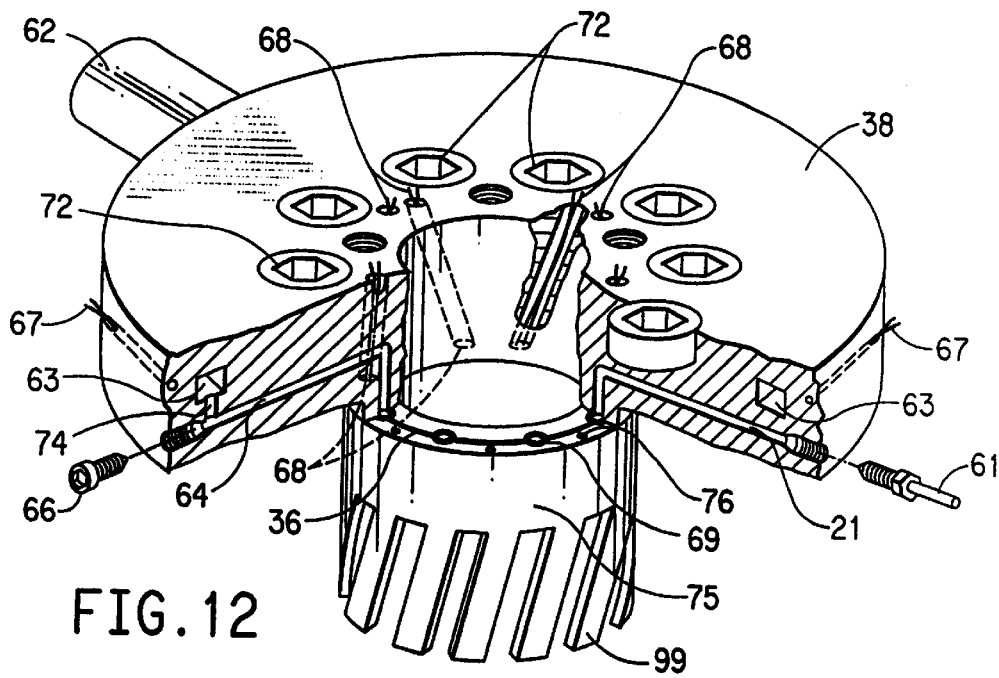
FIG. 12
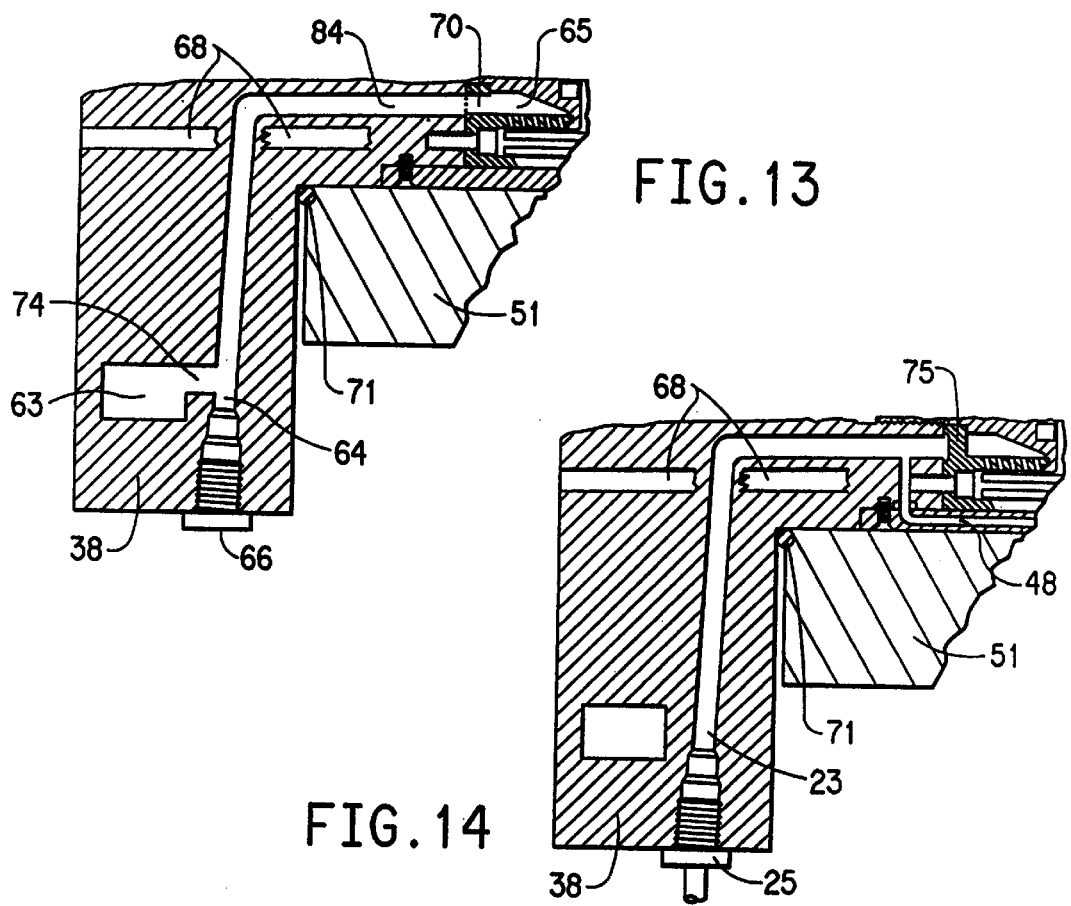
FIG. 13
FIG. 14

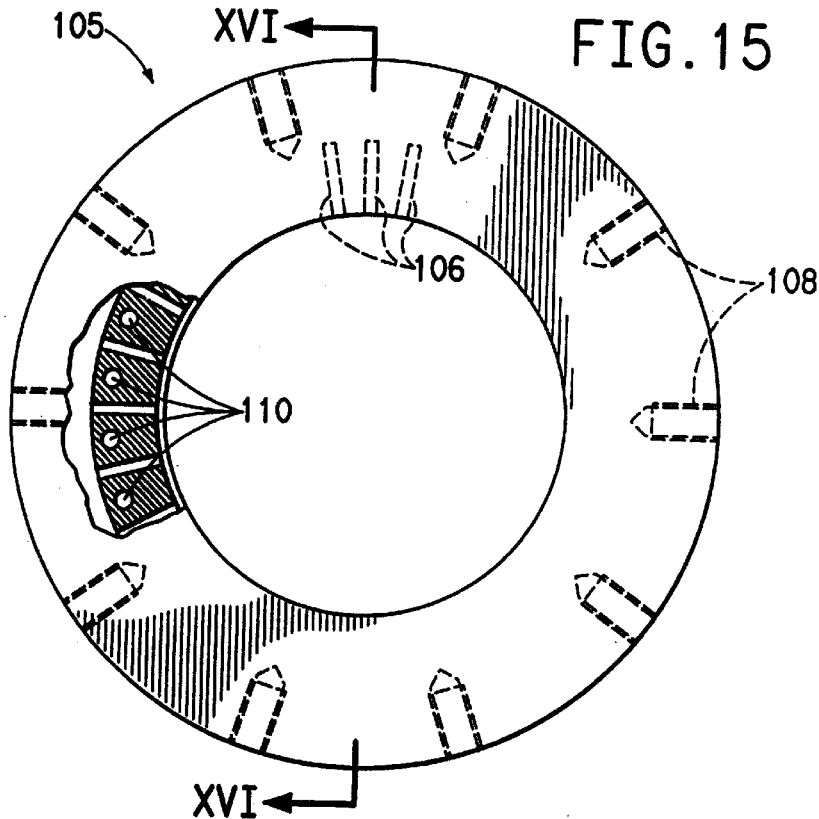
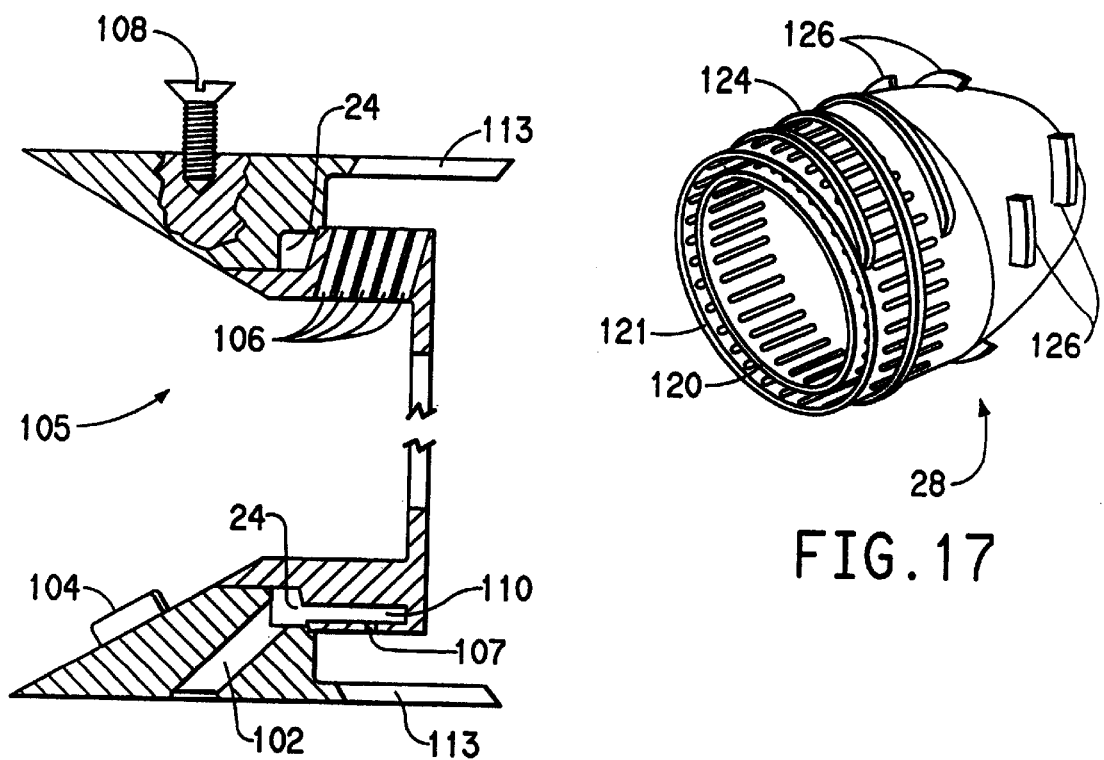

PROCESS AND APPARATUS FOR MECHANICALLY MIXING POLYMERS AND LOWER VISCOSITY FLUIDS

This application claims the benefit of U.S. Provisional Application No. 60/005,875, filed on Oct. 26, 1995.

FIELD OF THE INVENTION

This invention relates to polymer mixing and more particularly to the mechanical generation of mixtures of polymers and lower viscosity fluids useful in flash spinning processes.

BACKGROUND OF THE INVENTION

The generation of mixtures of polymers and less viscous fluids is known in the art, as for example in the production of latex paints or in the preparation of polymers for fiber spinning. In such processes, polymers are frequently mixed by mechanical means with solvents, production intermediates or other polymers. Mechanical polymer mixing is also used to enhance polymer reactions, as for example in solution polymerizations.

Plexifilamentary film-fibril strands have been spun from dispersions of polymer in a spinning medium which is a non-solvent for the polymer at or below the medium's normal boiling point. Blades et al., U.S. Pat. No. 3,081,519 (assigned to E. I. du Pont de Nemours and Company ("DuPont")), describes a process wherein a solution of fiber-forming polymer in a liquid spin agent that is not a solvent for the polymer below the liquid's normal boiling point, at a temperature above the normal boiling point of the liquid, and at autogenous pressure or greater, is spun into a zone of lower temperature and substantially lower pressure to generate plexifilamentary film-fibril strands. As disclosed in Anderson et al., U.S. Pat. No. 3,227,794 (assigned to DuPont), plexifilamentary film-fibril strands are best obtained using the process disclosed in Blades et al. when the pressure of the polymer and spin agent solution is reduced slightly prior to flash spinning. Optimum strands are obtained when, in a preflashing letdown chamber, the pressure of the polymer and spin agent solution is reduced so as to form a two-phase solution comprised of a fine homogeneous dispersion of a spin agent rich phase in a polymer rich phase. When this two-phase solution is released through a spinning orifice into a zone of lower temperature and pressure, the spin agent vaporizes and thereby cools the polymer which in turn forms the plexifilamentary film-fibril strands.

Anderson et al. discloses that successful flash spinning of plexifilamentary webs from a dispersion formed according to the process of Blades et al. requires precise control of process parameters such as pressure, temperature and the ratio of polymer to spin agent. Successful spinning of a given polymer according to the process of Blades et al. requires a compatible spinning agent and exacting adherence to the predetermined set of process parameters. Following the customized process parameters promotes the proper formation of a polymer dispersion in the letdown chamber such that a useful plexifilamentary web can be spun.

Flash spinning of polymers using the process of Blades et al. and Anderson et al. is restricted to those polymers for which there exists a compatible spin agent that: (1) is a non-solvent to the polymer below the spin agent's normal boiling point; (2) forms a solution with the polymer at high pressure; (3) forms a desired two-phase dispersion with the polymer when pressure is reduced slightly in a letdown chamber; and (4) flash vaporizes when released from the letdown chamber into a zone of substantially lower pressure. Establishing successful processing parameters for each polymer and spin agent combination is a time consuming process. Indeed, for certain fiber forming polymers, there is no set of practical process parameters by which the polymer can be successfully flash spun using the process of Blades et al. and Anderson et al. These processing requirements make it especially difficult to spin blends of polymers. The process disclosed in Blades et al. and Anderson et al. also has the disadvantage that many useful flash spinning agents, such as aromatic hydrocarbons, aliphatic hydrocarbons, and halogenated hydrocarbons (including fluorocarbons) cannot be readily released into the atmosphere.

It has been found that quality plexifilamentary webs can be formed from a finely divided dispersion of polymer in a spin agent without first forming a solution of the polymer and the spin agent. A process for flash spinning of polymers from a mechanically generated dispersion of polymer, $CO_2$ and water was first disclosed in Coates et al., U.S. Pat. No. 5,192,468 (assigned to DuPont), which is hereby incorporated by reference. The examples described in Coates et al. were performed using a lab scale autoclave with a turbine-blade agitator that mixed the polymer, carbon dioxide and water prior to spinning.

In order to perform commercial spinning of polymers according to the process of U.S. Pat. No. 5,192,468, a continuous stream of a homogeneous dispersion of polymer, $CO_2$ and water must be supplied to the spinning equipment. The dispersion must be sufficiently homogeneous such that the mixture passing through the spinning orifice at any given time includes all three ingredients. If the mixture passing through the spinning orifice comprises substantially 100% $CO_2$ and water at a given time, the spinning process will be disrupted by spits or bursts of vapor.

In commercial spinning of certain polymers according to the process disclosed in U.S. Pat. No. 5,192,468, the residence time of the ingredients in the mixer should be minimized. Certain polymers are known to degrade in the presence of heat and water. Thus, the time during which the polymer is mixed with the water should be as brief as possible so as to avoid polymer degradation. However, it is difficult for a mixer to attain sufficient mixing while also minimizing ingredient residence times in the mixer.

Existing mixer technology, as for example the mixer disclosed in Korstvedt, U.S. Pat. No. 4,066,246, cannot generate the continuous homogeneous two phase dispersions of immiscible fluids, such as the viscous polymer, carbon dioxide and water dispersion required for flash spinning according to the process of U.S. Pat. No. 5,192,468. Known mixers do not provide the high pressure, high shear stress, thorough mixing, or the brief residence time, needed to create the polymer dispersion useful in the process of U.S. Pat. No. 5,192,468. Accordingly, there is a need for a mixer capable of continuously generating homogeneous mixtures of viscous polymers and fluids of substantially lower viscosities. There is also a need for a mixer capable of mechanically generating such continuous homogeneous mixtures in a very short period of time.

SUMMARY OF THE INVENTION

There is provided by this invention a mixing apparatus for continuously generating a homogeneous mixture of substances of widely different viscosities. The invention comprises a pressure vessel capable of sustaining a pressure of at least 7000 kPa; means for continuously injecting a viscous polymer into the vessel; means for continuously injecting a lower viscosity fluid into the pressure vessel, the viscous polymer having a viscosity at least 10,000 times greater than the viscosity of the lower viscosity fluid; means for continuously injecting an agent into the viscous polymer entering the pressure vessel that both plasticizes the viscous polymer and reduces the interfacial tension between the viscous polymer and the lower viscosity fluid; rotational mixing means disposed within the pressure vessel for mixing the polymer and the less viscous fluid; drive means for rotating the rotational mixing means; heating means for maintaining the temperature of the substances being mixed in the pressure vessel at a desired mixing temperature; and means for continuously discharging a homogeneous mixture of the polymer, the plasticizing agent, and the less viscous fluid. The rotational mixing means may comprise a rotor with a plurality of shearing blades extending therefrom in an outward direction wherein the pressure vessel has an inner surface that defines a hollow space within which the rotor is rotatably disposed, and the pressure vessel has a plurality of fixed cutting blades extending from the inner surface in an inward direction, the clearance between the cutting blades extending from the rotor and the fixed cutting blades being less than 5 mm.

The process for using the mixing apparatus of the invention may comprise the steps of continuously injecting a viscous polymer melt into a mixer pressure vessel; continuously injecting a plasticizing agent into the viscous polymer melt entering the pressure vessel; maintaining the temperature of the pressure vessel at a desired mixing temperature; mixing the polymer and plasticizing agent in a first mixing zone of said pressure vessel; propelling the mixture of polymer and plasticizing agent to a second mixing zone of said pressure vessel; adding a lower viscosity fluid to the mixture of polymer and plasticizing agent propelled from the first to the second mixing zone; mixing the polymer, plasticizing agent, and lower viscosity fluid to form a homogeneous mixture; and continuously discharging the homogeneous mixture from the pressure vessel.

BRIEF DESCRIPTION OF THE DRAWINGS

The accompanying drawings, which are incorporated in and constitute a part of this specification, illustrate the presently preferred embodiment of the invention and, together with the description, serve to explain the principles of the invention.

FIG. 12 is a perspective cut-away view of the lid of the mixer shown in FIG. 4.

FIG. 13 is a partial cross-sectional view of the mixer lid of FIG. 12 showing one of the polymer sprues.

FIG. 14 is a partial cross-sectional view of the mixer lid of FIG. 12 showing the low viscosity fluid inlet.

FIG. 15 is a front end view of a second ring-shaped part in the mixer shown in FIG. 4 taken along a plane that is perpendicular to the rotational axis of the mixer.

FIG. 16 is a cross-sectional view of the ring-shaped mixer part shown in FIG. 13 taken along a plane that is perpendicular to the rotational axis of the mixer.

FIG. 17 is a perspective view of a section of the rotor for the third mixing zone of the mixer shown in FIG. 4.

DETAILED DESCRIPTION OF THE PREFERRED EMBODIMENT

Figure 1:
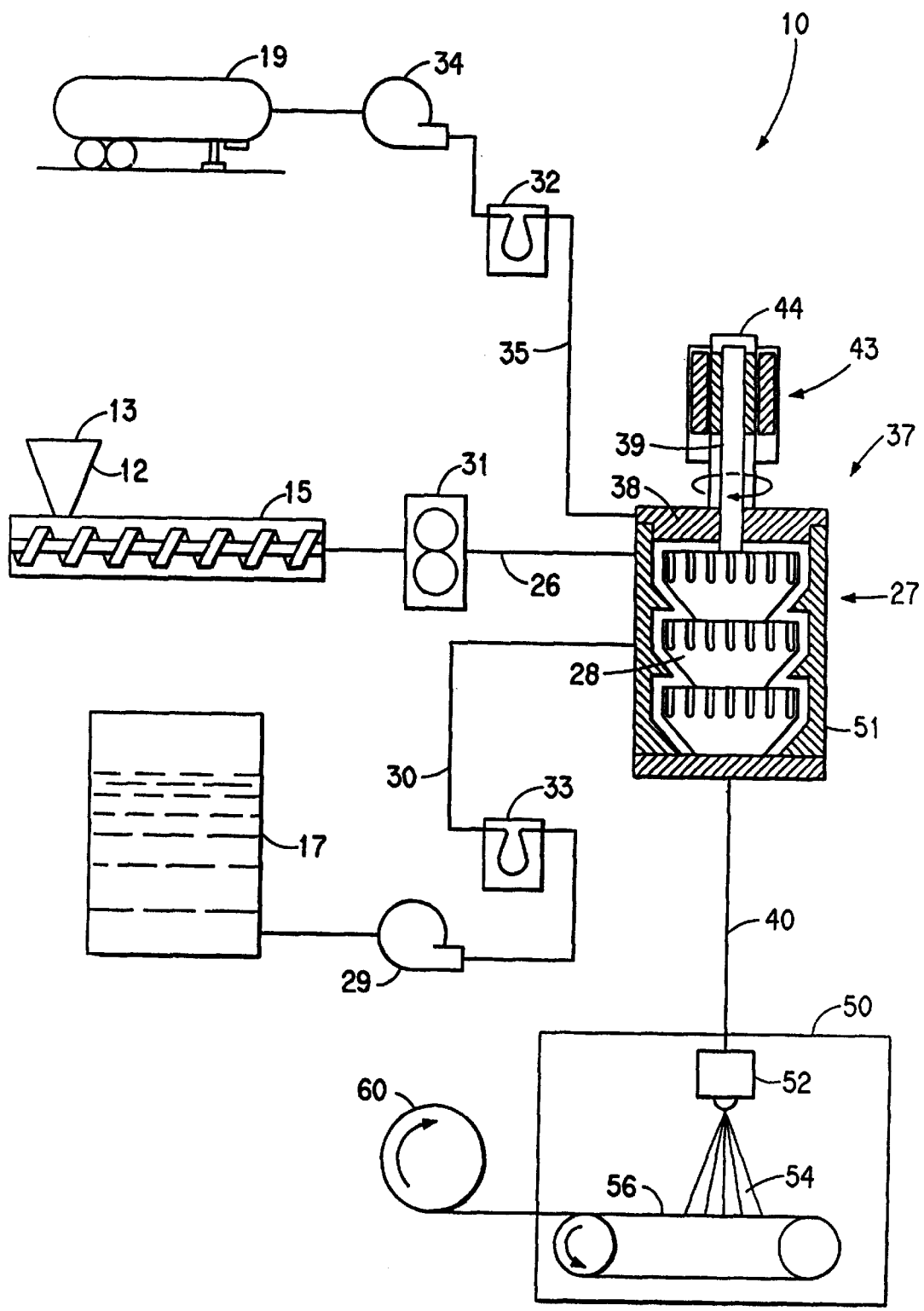
FIG. 1 is a schematic diagram of a polymer flash spinning process utilizing the mixer of the present invention.

Reference will now be made in detail to the presently preferred embodiments of the invention, examples of which are illustrated in the accompanying drawings. Throughout the drawings, like reference characters are used to designate like elements.

In FIG. 1, a spinning assembly 10 for spinning a bulk polymer is illustrated. Spinning assembly 10 comprises a hopper 12 for receiving a polymer 13, preferably in the form of beads, a screw extruder 15 for melting the polymer and a mixer 27. Polymer 13 should be a plasticizable polymer, as for example polyethylene, polypropylene, polyurethane or the other polymers disclosed in Coates et al., U.S. Pat. No. 5,192,468. A spin agent 17 is provided at high pressure to the mixer 27 via pump 29 and supply line 30. A plasticizing agent 19 is provided at high pressure to the mixer 27 via pump 34 and supply line 35. The rate at which polymer is injected into mixer 27 via supply line 26 is controlled by gear pump 31. The supply of plasticizing agent and spin agent into mixer 27 is monitored by metering devices 32 and 33, respectively, as will be described in more detail below. After being mixed, the polymer, plasticizing agent and spin agent mixture is carried by discharge line 40 to a spin cell 50. The mixture is delivered into a lower pressure and temperature environment within a spin cell 50 by way of the spin nozzle 52 and forms plexifilamentary film-fibril strands 54, as described in Coates et al., U.S. Pat. No. 5,192,468. Strands 54 may be laid out as a web on a belt 56 and carried out of the spin cell by suitable roll-up equipment 60, or may be twisted into a yarn, as is known in the art.

According to the invention, mixer 27 includes a rotational mixing means. As embodied herein, the rotational mixing means comprises a rotor 28 that is rotatably disposed within a pressure vessel 37 of mixer 27. Pressure vessel 37 is comprised of a mixer body 51, a mixer lid 38 and a drive shaft housing 44. Rotor 28 is mounted on and fixed to a rotational drive shaft 39. The shaft 39 passes through mixer lid 38. According to the preferred embodiment of the invention, the means for driving the rotational mixing means comprises a magnetic coupling 43 on housing 44 that is driven by a motor (not shown).

Figure 2:
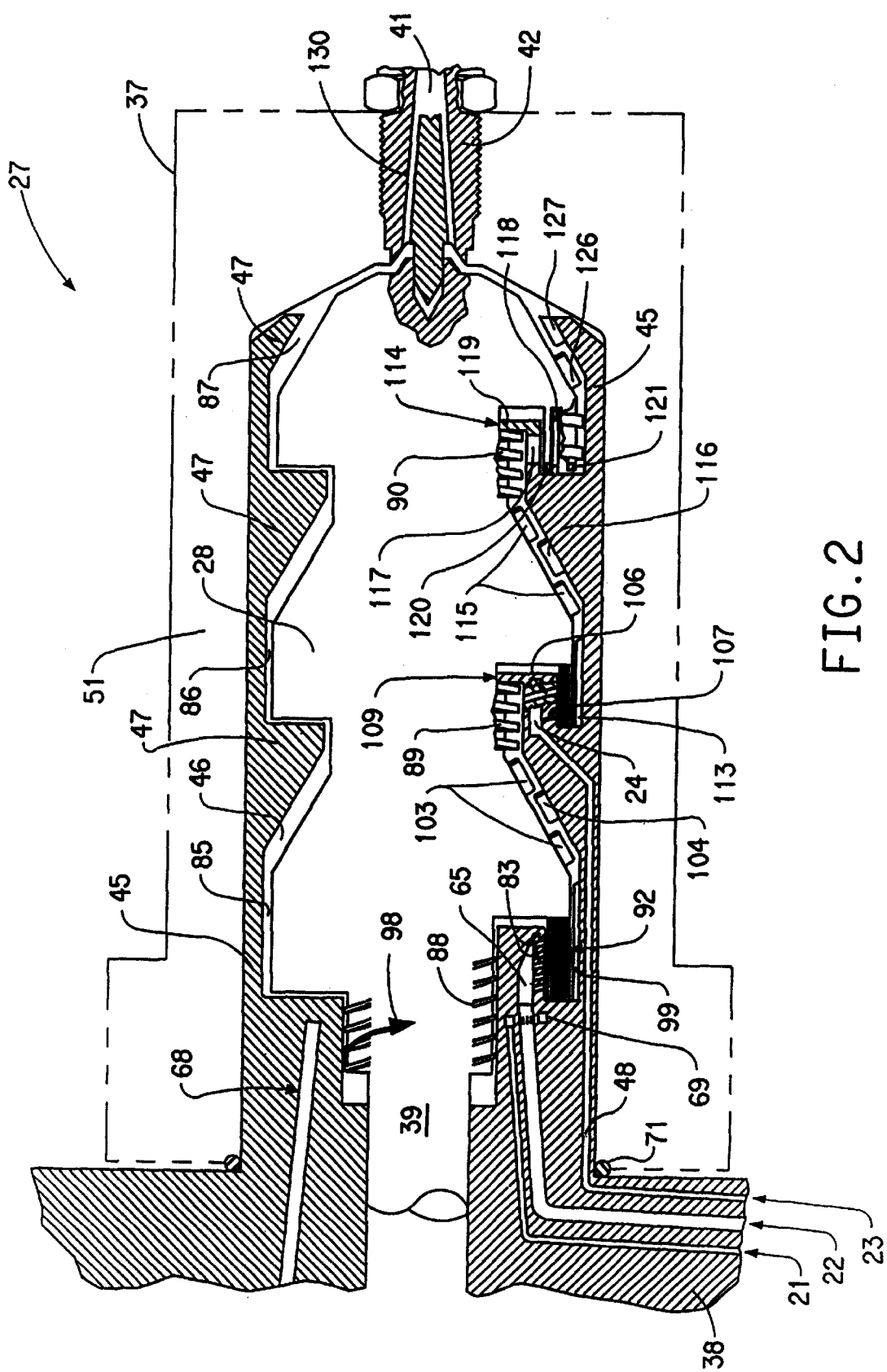
FIG. 2 is a schematic cross-sectional view of the mixer according to the preferred embodiment of the invention taken along a plane that passes through the rotational axis of the mixer.

A schematic cross-sectional view of mixer 27 is shown in FIG. 2. Mixer body 51 is preferably made of a strong alloy, such as corrosion resistant Hastelloy C, stainless steel SS316L, or high strength A286 steel alloy, and should be capable of sustaining a range of likely polymer mixing pressures. Preferably, mixer body 51 can sustain a pressure of at least 7000 kPa, and more preferably, it can sustain a pressure of at least 25,000 kPa. The pressure vessel used in the examples set forth below is rated to withstand a pressure of 41,000 kPa. A sleeve 45 fitted with protruding stator elements 47 (best seen in FIG. 4) fits within mixer body 51. The inside exposed surfaces of sleeve 45 and stator elements 47 generally complement the contours of the outside surface of the rotor 28. The exposed inside surfaces of sleeve 45 and stator elements 47 and the outside surface of rotor 28 together define the mixing chamber 46 of mixer 27.

The mixing apparatus of the present invention includes means for continuously injecting a viscous polymer into pressure vessel 37, means for continuously injecting a lower viscosity fluid into pressure vessel 37, and means for injecting a plasticizing agent into pressure vessel 37. As embodied herein, the polymer injection means comprises the screw extruder 15, as shown in FIG. 1, that heats and extrudes a polymer, the gear pump 31 and a polymer inlet passage 22. In an alternative embodiment of the invention, polymer can be injected into mixer 27 in slurry form rather than as a melt. Preferably, gear pump 31 is a metering gear pump, as for example, a model HXB-5647-125 pump manufactured by Zenith Pumps (division of Parker Hannifin Corp.) of Sanford, N.C. Pump 31 increases the pressure of the polymer before the polymer is carried through an aluminum jacketed, electrically heated and insulated steel transfer line 26 to the mixer 27. Extruder 15 and pump 31 regulate the flow of polymer into mixer 27. The polymer enters mixer 27 through a polymer inlet passage 22 in the mixer lid 38, as shown in FIG. 2. Polymer inlet passage 22 is described more fully below with the description of FIG. 8. Preferably, pump 31 increases the pressure of the polymer entering mixer 27 to between 4000 and 40,000 kPa. If the polymer is to be mixed with a supercritical $CO_2$ plasticizing agent, as provided in Coates et al., U.S. Pat. No. 5,192,468, then pump 31 should increase the polymer pressure to between about 7380 and 40,000 kPa before the polymer enters mixer 27.

According to the invention, the plasticizing agent injection means comprises a pump 34 for pumping a plasticizing agent 19 from a source of plasticizing agent to the inlet passage 21 of the mixer 27. The plasticizing agent source may, for example, be a tank of liquid $CO_2$ at 0° C. and 2000 kPa. In alternative applications of the mixer of the invention, a solvent or other fluid could be injected into mixer 27 via pump 34 and inlet passage 21. For example, spin agents useful in conventional flash spinning could be added to mixer 27 through passage 21. Among the liquids that could be injected through passage 21 are aromatic hydrocarbons such as benzene, toluene, etc.; aliphatic hydrocarbons such as butane, pentane, hexane, heptane, octane and their isomers and homologs; cyclic hydrocarbons such as cyclohexane; unsaturated hydrocarbons; halogenated hydrocarbons such as methylene chloride, carbon tetrachloride, chloroform, ethyl chloride, methyl chloride; alcohols; esters; ethers; ketones; nitrites; amides; fluorocarbons and chlorofluorocarbons; sulfur dioxide; carbon disulfide; nitromethane; water and mixtures of the above liquids. Passage 21 could also be used to inject a variety of gases into the polymer being injected into mixer 27, including nitrogen, helium, hydrogen, methane, propane, butane, ethylene, propylene, butene, and mixtures thereof.

When a plasticizing agent is injected into mixer 27 through inlet passage 21, pump 34 increases the pressures of the plasticizing agent such that the plasticizing agent is at a desired pressure when it enters mixer 27. Preferably, pump 34 is a double acting piston pump, as for example a model 53330-8DSFD-100 pump manufactured by Haskel, Inc. of Burbank, Calif. If supercritical $CO_2$ is the plasticizing agent, as provided in the process disclosed in Coates et al., U.S. Pat. No. 5,192,468, then pump 34 should increase the pressure of the $CO_2$ to at least 7380 kPa before the $CO_2$ enters mixer 27. A metering device 32, as for example a coriolis effect mass-flow type meter, such as a model D-12 meter manufactured by Micromotion, Inc. of Boulder, Colo., measures the flow of the plasticizing agent and regulates the flow of plasticizing agent pumped by pump 34 into mixer 27. When the plasticizing agent is supercritical $CO_2$, the mass ratio of plasticizing agent to polymer is preferably between 0.4 to 1 and 1.4 to 1.

According to the preferred embodiment of the invention, the low viscosity fluid injection means comprises a pump 29 for pumping a low viscosity fluid from a fluid source 17 to the low viscosity fluid inlet passage 23 of the mixer 27. Preferably, pump 29 is a double acting piston pump, as for example a model 53330-8DSFD-100 pump manufactured by Haskel, Inc. of Burbank, Calif. If the low viscosity fluid to be mixed with the polymer is water, as provided in the process of Coates et al., U.S. Pat. No. 5,192,468, then the fluid source can be a tank 17 of distilled water. Other low viscosity fluids, including the fluids and gases listed above as being injectable through inlet passage 21, could be introduced into mixer 27 via pump 29 and inlet passage 23 for mixing with various polymers.

When polymer, $CO_2$ and water are to be mixed in mixer 27, pump 29 should increase the water pressure to a mixing pressure between about 7380 and 40,000 kPa before the water enters mixer 27. A metering device 33, similar to the metering device 32, measures the flow of the water and regulates the flow of water pumped by pump 29 into mixer 27. When the plasticizing agent is $CO_2$ and the lower viscosity fluid is water, the mass ratio of water to polymer is preferably between about 0.2 to 1 and 1.2 to 1.

Figure 3:
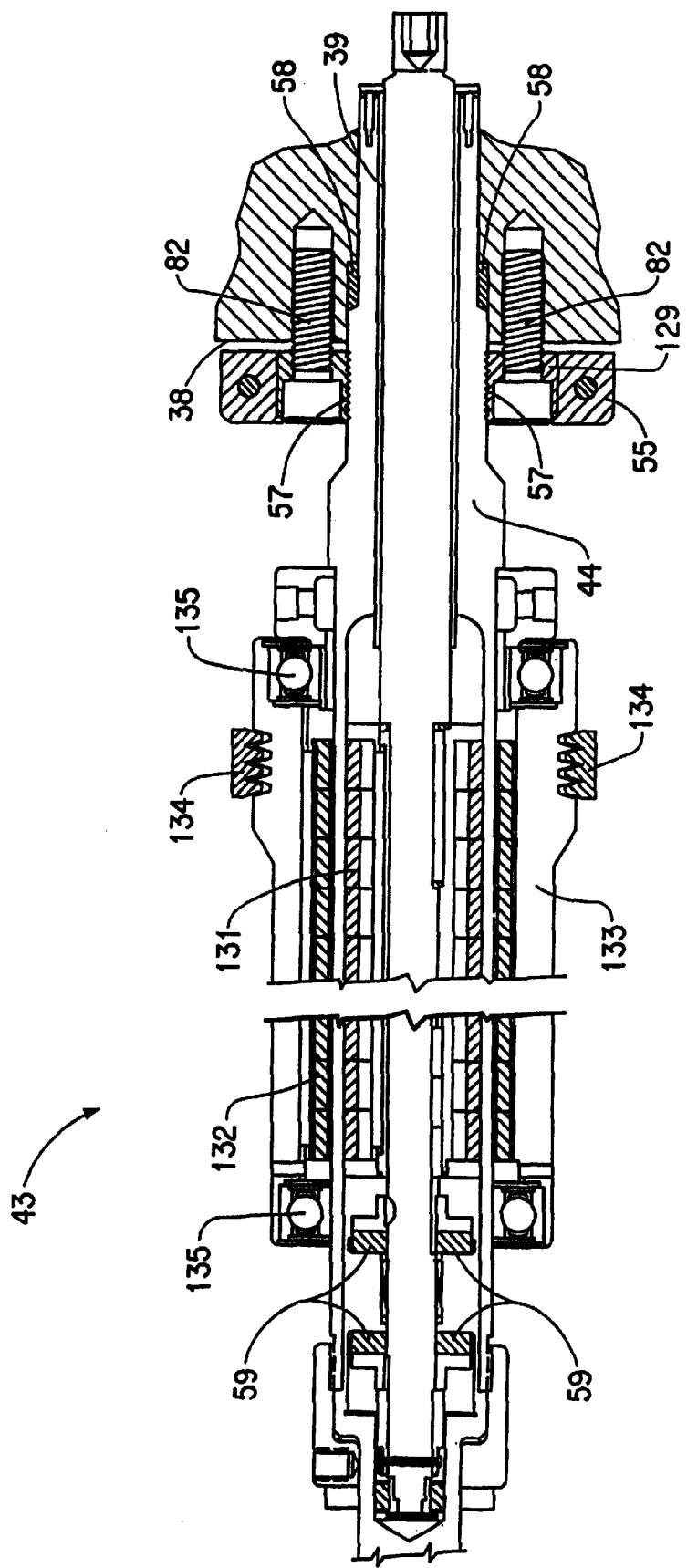
FIG. 3 is a cross-sectional view of the magnetic drive system for the mixer shown in FIG. 2 taken along a plane that passes through the rotational axis of the drive shaft.

According to the invention, a drive means for rotating the rotational mixing means is provided. In the preferred embodiment of the invention, the mixer rotor 28 is mounted on a rotational drive shaft 39 that is rotationally driven by way of the magnetic drive coupling 43, as best shown in FIG. 3. Magnetic drive coupling 43 is preferably a seal-less drive capable of delivering a torque of 160 newton meters, as for example, the AE Magnedrive II 2.75–20 magnetic drive manufactured by, Autoclave Engineering of Erie, Pa. Shaft 39 rotates within a drive shaft housing 44 that is preferably rated to withstand the same working pressure as the mixer body 51 and the mixer lid 38, as for example a 43,000 kPa working pressure. Housing 44 is machined with external screw threads 57 that screw into internal threads on flange 129. Bolts 82 pass through flange 129 and screw into mixer lid 38 such that a metal-to-metal seat 58 seals housing 44 with pressure vessel lid 38. To prevent lock-up of drive shaft 39, a flange heater 55 may be provided for heating shaft housing 44 above the melt point of the polymers last mixed. The free end of shaft 39 is supported by carbon thrust bearings 59.

In the magnetic drive coupling shown in FIG. 3, shaft 39 is turned by a motor (not shown) via an assembly of magnets 131 fixed on shaft 39 that are magnetically coupled to a plurality of magnets 132 outside of the shaft housing 44. The magnets 132 are mounted on the inside surface of a rotatable sleeve 133. Magnets 131 and 132 are preferably samarium-cobalt magnets. In the preferred embodiment of the invention shown in FIG. 3, the outer magnets 132 are comprised of twenty 1 inch thick toroidally-shaped magnet segments that each encircle the shaft housing 44. The magnets 131 on drive shaft 39 may similarly be comprised of twenty 1 inch thick toroidally-shaped magnet segments that each encircle the shaft 39. Bearings 135, as for example sealed and shielded Conrad type ball bearings, hold sleeve 133 on shaft housing 44 and permit magnets 132 to freely rotate about the housing 44. A conventional motor, preferably a 22,000 joule per second electric motor (not shown), turns a belt 134 so as to rotate sleeve 133, which in turn rotates the magnetically coupled magnets 132 and 131 and the drive, shaft 39. Preferably, coupled magnets 132 and 131 are capable of applying a torque of at least 160 newton meters to the drive shaft 39. Thus, mixer 27 can be operated at high pressures and at high rates of rotation that would be very difficult to attain if it were necessary to maintain a pressure seal around rotating shaft 39. With the drive means of the present invention, mixer rotor 28 can be rotated under pressures as high as 41,000 kPa and at rates between 500 and 1300 rpm with minimal friction losses, without overheating of seals, and without contamination of ingredients being mixed by lubrication oils.

Figure 4:
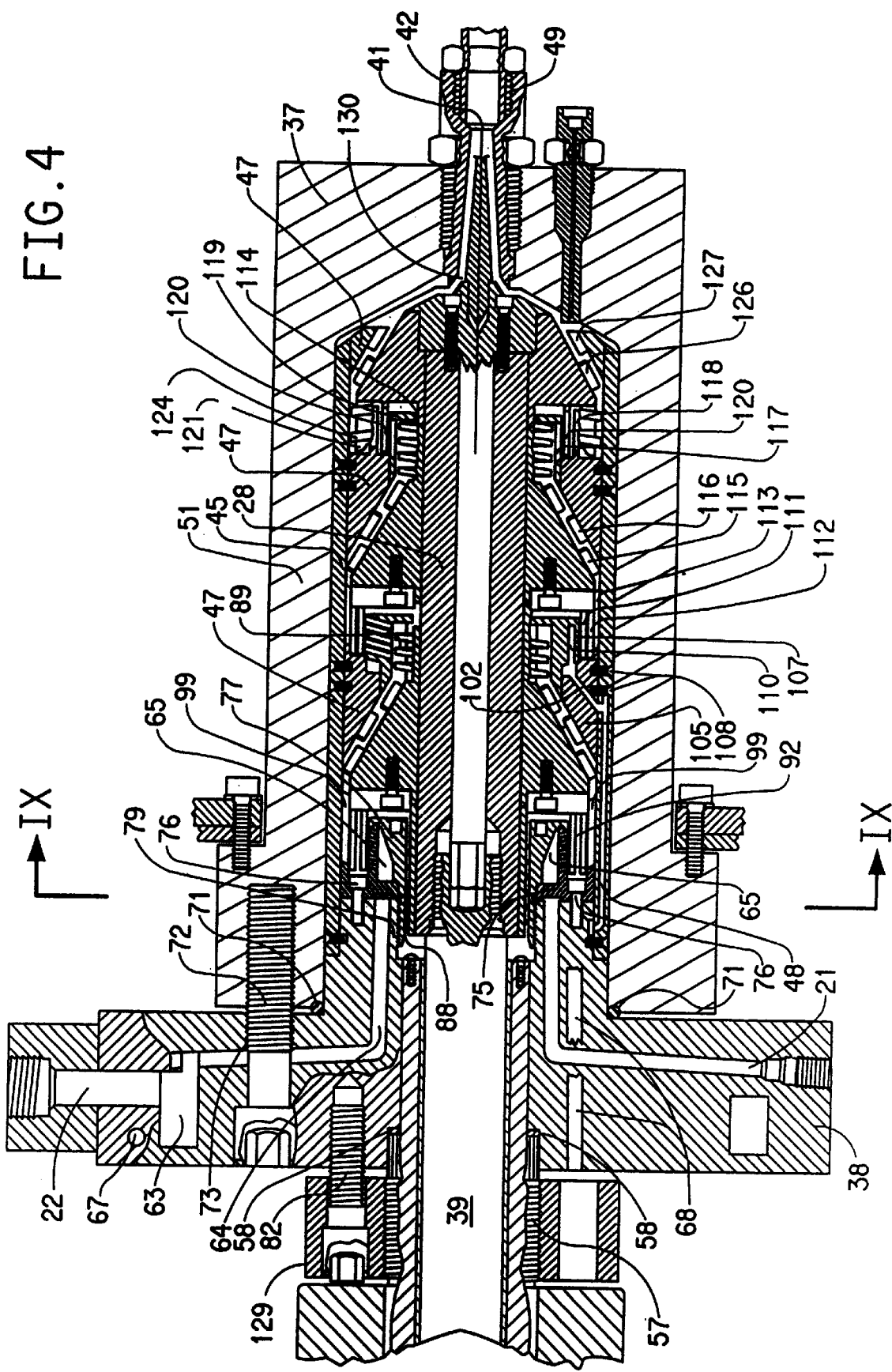
FIG. 4 is a detailed cross-sectional view of the mixer shown in FIG. 2.

The pressure vessel lid 38 and the passages in lid 38 for delivering polymer and plasticizing agent into mixing chamber 46 will now be described with reference to FIGS. 4 and 8–14. Lid 38 is preferably made of high-strength corrosion resistant alloy such as Hastelloy C, stainless steel SS316L, or A286 steel alloy. As can be seen in FIG. 4, lid 38 is bolted to mixer body 51 by a plurality of lid bolts 72 that pass through the clearance holes 73 in lid 38 and screw into mixer body 51. Bolts 72 are preferably made of an alloy steel. The face of lid 38 is fitted with a Gache ring 71 of Hastelloy C that seals mixer body 51 with mixer lid 38.

Figure 8:
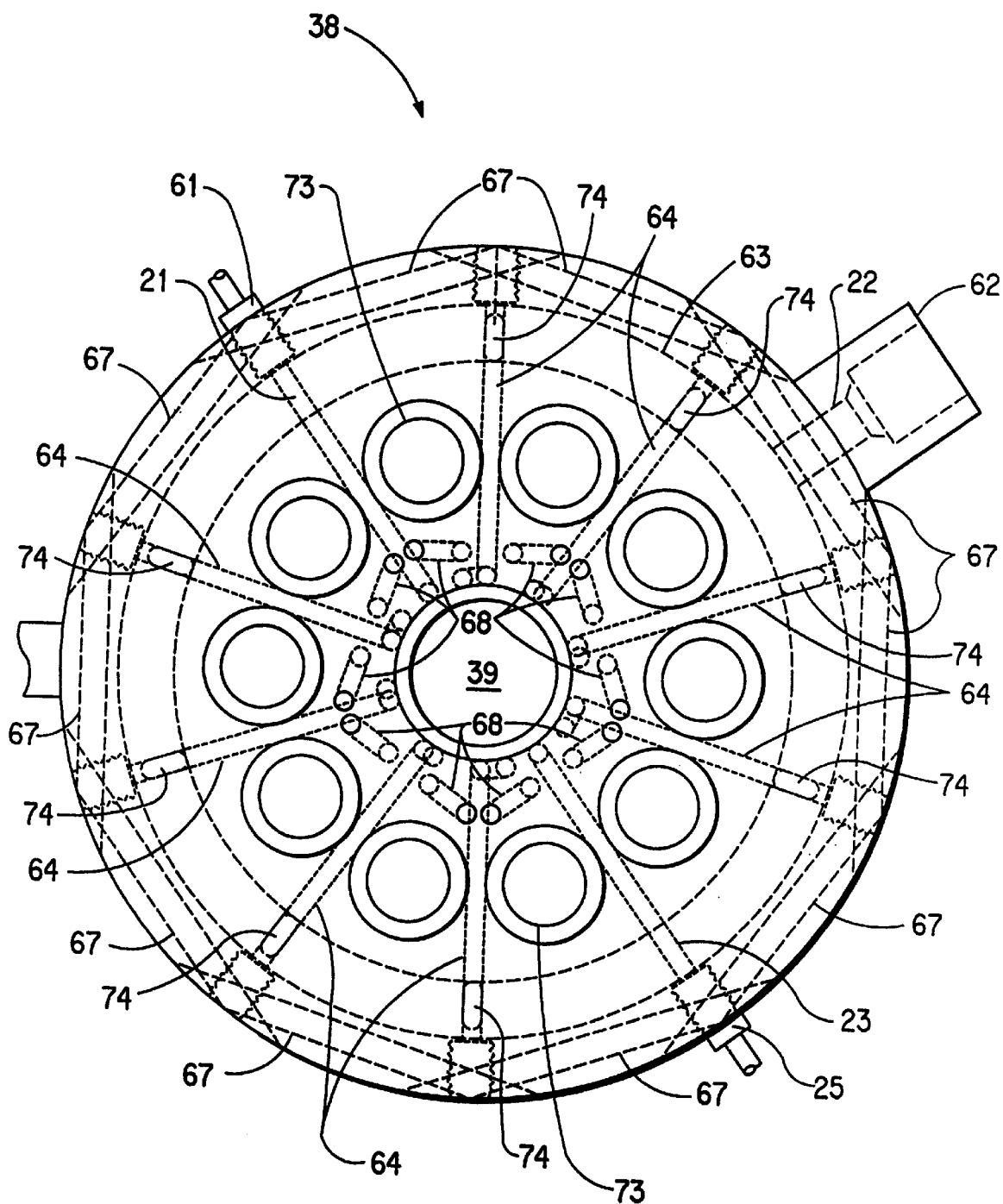
FIG. 8 is an end view of the lid of the mixer shown in FIG. 4.
Figure 9:
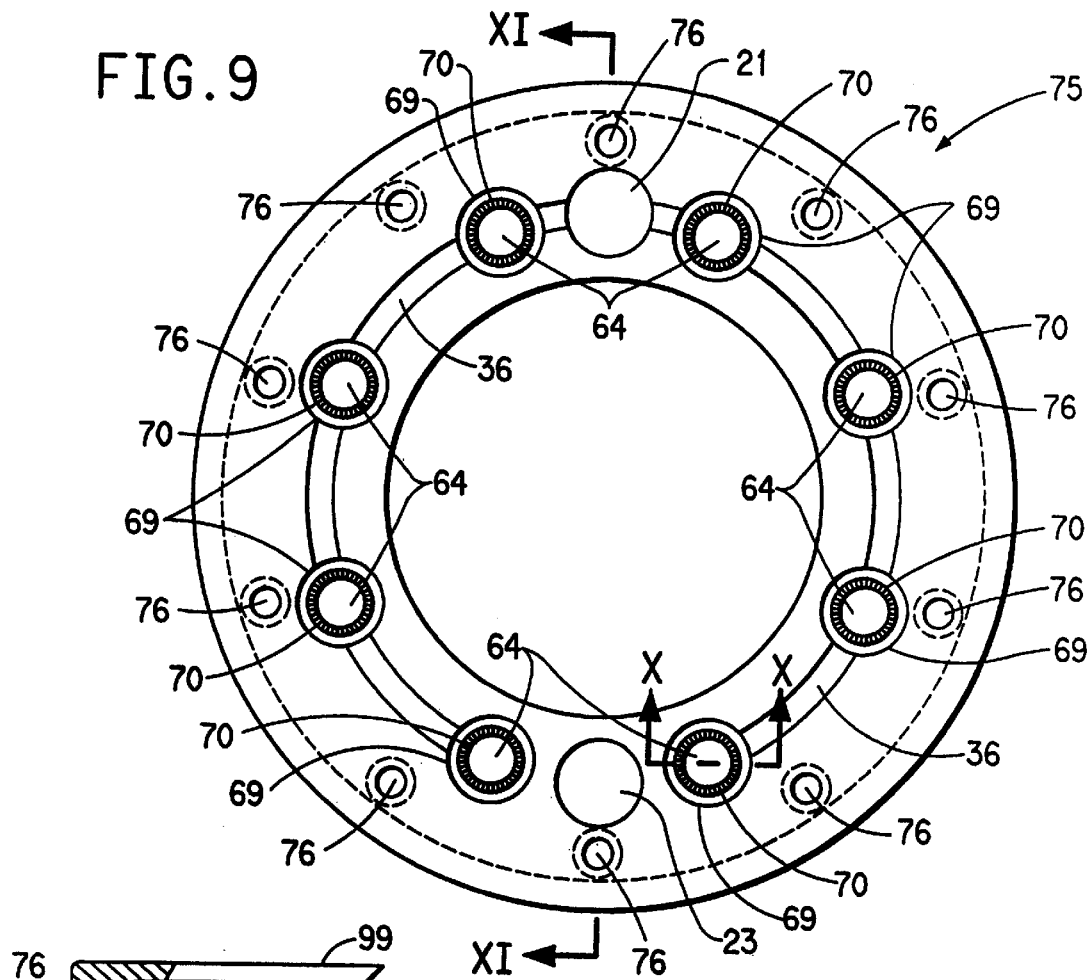
FIG. 9 is a front view of a ring-shaped part in the mixer shown in FIG. 4 taken along a plane IX—IX that is perpendicular to the rotational axis of the mixer.

As can be seen in FIG. 8, polymer entering mixer 27 enters by way of polymer inlet 62 and polymer inlet passage 22 in lid 38 that are both sized large enough to minimize pressure drops. Passage 22 preferably has a cross-sectional area of about 200 mm² but could be made larger in order to accommodate higher polymer flow rates. Polymer inlet passage 22 connects polymer inlet 62 to ring-shaped polymer channel 63 in lid 38. Channel 63 preferably has a cross-sectional area, taken in a plane that includes the rotational axis of shaft 39, of about 600 mm². As best shown in FIG. 13, channel 63 is connected to a smaller diameter ring-shaped inlet chamber 65 by way of a plurality of slotted openings 74 and sprues 64. The sprues 64 divide the polymer into small streams such that the polymer can be efficiently contacted with a polymer plasticizing agent or other fluid. Each of the sprues 64 preferably has a cross-sectional area of about 30 mm² and the inlet chamber 65 preferably has a cross-sectional area, taken in a plane that includes the rotational axis of shaft 39, of about 125 mm². The lower ends 84 of the sprues 64 (FIG. 13) are angled such that the outlets of sprues 64 are spaced equally around the ring-shaped chamber 65. The offsets at the ends of the various sprues are best shown in FIG. 8.

As shown in FIG. 12, each sprue 64 can be made accessible for cleaning by way of a removable plug 66. In an alternative embodiment of the invention, one or more of the removable plugs 66 could be replaced by an injection port through which fluids can be injected into polymer passing through sprue 64. If desired, different fluids could even be injected into different sprues.

The temperature of polymer passing through lid 38 is maintained at a desired mixing temperature by a set of outer resistance heating elements 67 and inner resistance electric heating elements 68 (best seen in FIGS. 8 and 12). In the preferred embodiment of the invention, the outer heating elements 67 are ⅜ inch diameter 400 joule/sec resistance heating elements manufactured by Watlow, Inc. of Saint Louis, Mo. Inner heating elements 68 are similar ¼ inch diameter resistance heating elements. Heating elements 68 are inserted in 6.3 mm diameter holes bored in lid 38 that are angled so as to pass on opposite sides of each polymer sprue 64. Outer elements 68 are inserted in 9.4 mm diameter holes bored in lid 38 at angles so as to pass near, but not through, the polymer passages and other passages in lid 38.

The plasticizing agent or other fluid injected into the polymer in lid 38 enters mixer 27 passes through an inlet 61 (best shown in FIG. 12) and into the inlet passage 21. Inlet passage 21 preferably has a cross sectional area of about 30 mm². The inlet passage 21 connects to a ring-shaped passage 36, that preferably has a cross sectional area, taken in a plane that includes the rotational axis of shaft 39, of about 30 mm², and can be best seen in FIG. 9. Passage 36 interconnects through annular rings 69 that circumscribe each of the polymer sprues 64. A plurality of fine slots 70 in the wall of each of the polymer sprues connect each sprue with a corresponding annular ring 69. In the preferred embodiment of the invention, passage 36, rings 69 and slots 70 are machined into the face of a ring member 75 (best shown in FIG. 9) that fits into sleeve 45 and abuts the face of lid 38. Ring member 75 is firmly attached to and sealed against a smooth face of lid 38 by a plurality of cap screws 76.

Figure 10:
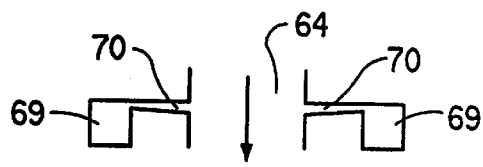
FIG. 10 is a schematic cross-sectional view of a plasticizing agent inlet shown in FIG. 9 taken along the plane X—X.

FIG. 10 shows a schematic cross sectional view of one of the annular rings 69 and the corresponding sprue 64. The slots 70 are machined such that a plasticizing agent or other fluid being injected from ring 69 into polymer passing through sprue 64 in the direction indicated by the arrow undergoes a small pressure drop as it passes from ring 69 to sprue 64. This pressure drop maintains the pressure in ring 69 slightly above the pressure in sprue 64 such that polymer in sprue 64 is not pushed back into ring 69. When the plasticizing agent is supercritical $CO_2$, the cross-section of the narrowest portion of each of the slots 70 should be in the range of 0.05–0.3 mm² to achieve a desirable pressure drop of between 300 and 550 kPa. A higher pressure drop across slot 70 should improve the injection of the plasticizing agent into the polymer passing through the sprue 64. Each of the slots 70 preferably widens as the slot extends from ring 69 to sprue 64. This widening helps prevent the clogging of the slots 70 with polymer.

Figure 11:
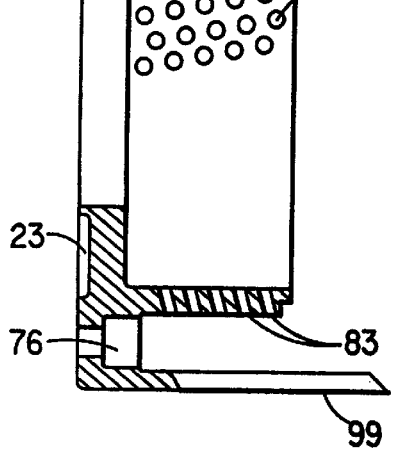
FIG. 11 is a partial cross-sectional view of the ring-shaped mixer part shown in FIG. 9.

After the polymer is injected with plasticizing agent or other fluid, it passes into the ring-shaped polymer inlet chamber 65. According to the preferred embodiment of the invention shown in FIG. 4, chamber 65 is formed between the inner surface of ring member 75 and the outer surface of the externally threaded ring 77 that screws into threads 79 in mixer lid 38. As shown in FIG. 11, a plurality of holes 83 are bored through the wall of ring member 75 that forms the outer wall of polymer inlet chamber 65. According to the preferred embodiment of the invention, ring member 75 is bored with more than seventy holes 83. More preferably, the holes 83 are about 1.7 mm in diameter and are bored through ring member 75 at an angle of about 75° from the center line of ring member 75. Holes 83 are arranged in about 25 rows of five holes as shown in FIG. 11. The pressure of the incoming polymer and plasticizing agent forces the mixture of polymer and plasticizing agent in the polymer inlet chamber 65 to pass through the holes 83 and in so doing divides the polymer and plasticizing agent mixture into fine noodle-like strands as the mixture enters the mixing chamber 46.

According to the invention, the mixing chamber 46 has one or more mixing zones. In the preferred embodiment of the invention shown in FIG. 2, mixing chamber 46 is divided into three mixing zones. A first mixing zone 85 is located between a first set of helical rotor threads 88 and a second set to helical rotor threads 89. A second mixing zone 86 is located between the second set of helical rotor threads 89 and a third set of helical rotor threads 90. A third mixing zone 87 is located between the third set of helical rotor threads 90 and the mixer outlet 41. When the mixer is used to mix a polymer, a plasticizing agent and a lower viscosity fluid, the polymer and plasticizing agent are thoroughly mixed in the first mixing zone 85. A lower viscosity fluid is added to the mixture of polymer and plasticizing agent in the second mixing zone 86 where a dispersion of polymer, lower viscosity fluid and plasticizing agent can be formed. In the third mixing zone 87, the dispersion of polymer, lower viscosity fluid and plasticizing agent can be made finer and more homogeneous before being discharged through the mixer outlet 41. Alternatively, the mixer could be used to mix a polymer with another lower viscosity fluid such as one of the fluids listed above as being injectable through inlet passage 21, in the first mixing zone of mixer 27. Likewise, the polymer can be mixed with a second lower viscosity fluid, or with more of the first lower viscosity fluid, in the second mixing zone.

According to the preferred embodiment of the invention, the threads 88 on rotor 28 form a seal between the first mixing zone and the area around the drive shaft 39. If a cooling fluid, such as water, is used to cool rotating drive shaft 39, a small amount of the cooling fluid will be pumped by the screw auger pumping action arising from the rotation of the threads 88. This pumping action helps prevent polymer and other fluids in the first mixing zone from migrating back into the area around shaft 39.

Figure 5:
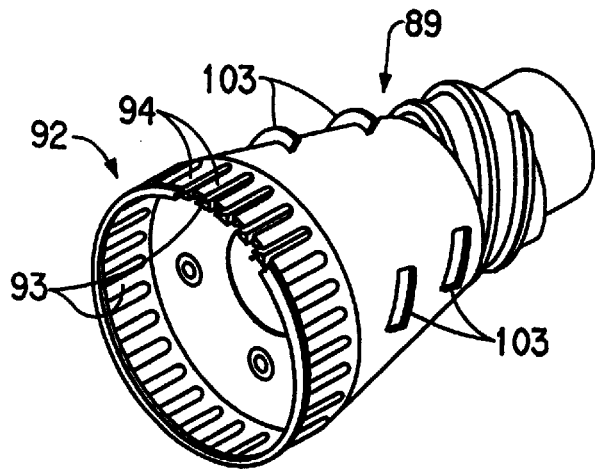
FIG. 5 is a perspective view of one section of the rotor for the mixer shown in FIG. 2 that has been cut away to show the rotor cutting blades.
Figure 6:
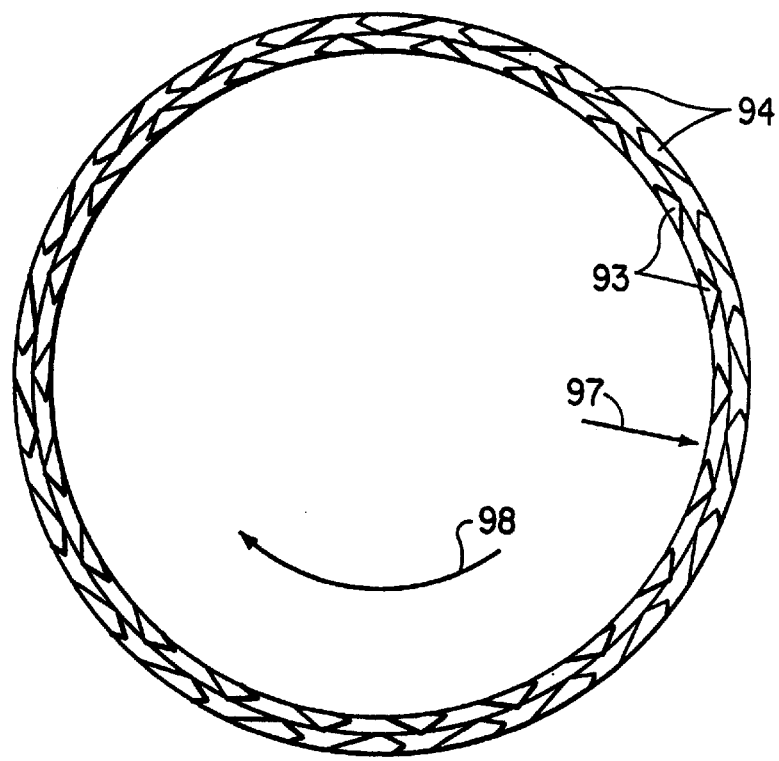
FIG. 6 is a cross-sectional end view of the cutting blades on the rotor section shown in FIG. 5.
Figure 7:
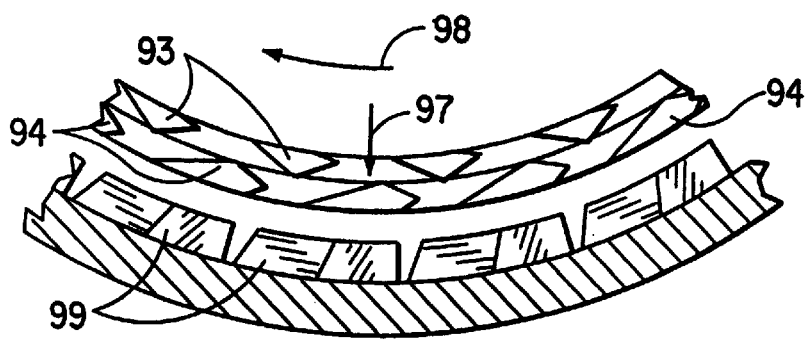
FIG. 7 is an enlarged view of a section of the rotor cutting blades shown in FIG. 6 and the fixed cutting blades opposite the rotor cutting blades.

According to the preferred embodiment of the invention, rotatable and fixed cutting blades in the first mixing zone are provided for vigorously cutting and mixing the noodles of polymer and plasticizing agent or other fluid that enter the first mixing zone 85 from the polymer inlet chamber 65. As can be seen in FIGS. 5–7, a ring of rotatable cutting blades 92 extend from the rotor in a direction parallel to the rotational axis of rotor 28. Rotatable cutting blades 92 include an inner set of cutting blades 93 and an outer set of cutting blades 94. In the preferred embodiment of the invention, the inner and outer sets of cutting blades 93 and 94 each comprise approximately 24 self sharpening blades. The cutting blades 93 and 94 are preferably made of stainless steel. As best shown in FIGS. 2 and 4, cutting blades 92 rotate in an annular grove formed in ring member 75 between the holes 83 and the fixed cutting blades 99.

The noodle-like threads of polymer and plasticizing agent or other lower viscosity fluid enter the first mixing zone 85 in the direction shown by the arrow 97 in FIGS. 6 and 7. The clearance between the ends of the polymer inlet orifices 83 and the cutting blades 93 is preferably less than 0.8 mm such that the threads of polymer entering the first mixing zone immediately come into contact with the inner set of rotating blades 93. According to the preferred embodiment of the invention, inner and outer blades 93 and 94 rotate in the direction shown by arrow 98 at a rate of at least 600 rpm, and more preferably at a rate of about 1200 rpm. In the preferred embodiment of the invention, the radial distance between the rotational axis of rotor 28 and the first cutting blades is about 45 mm such that inner cutting blades 93 are moving at a rate of between about 3.0 and 6.0 m/sec when the blades first come into contact with the mixture of polymer and plasticizing agent or other lower viscosity fluid entering the first mixing zone. Inner rotating blades 93 cut the noodle-like threads into tiny particles and accelerate the particles such that the particles are driven into contact with other such particles. Inner rotating blades 93 also impart centrifugal force on the particles so as to drive the particles through the spaces between the inner rotating blades and into contact with the outer rotating blades 94. Outer rotating blades 94 further accelerate, cut and mix the mixture of polymer and plasticizing agent or other lower viscosity fluid.

According to the preferred embodiment of the invention, a plurality of fixed cutting blades 99 extend from the ring member 75 (FIG. 11) and around the inside surface of sleeve 45. The fixed blades 99 circumscribe the outer rotating blades 94. Preferably the clearance between outer rotating blades 94 and fixed cutting blades 99 is less than 0.8 mm. Fixed cutting blades 99 are self-sharpening and self-cleaning, and are preferably made of stainless steel. In the preferred embodiment of the invention, approximately twenty-five fixed 6 mm wide cutting blades 99 surround the two sets of twenty-four rotating blades 93 and 94. The centrifugal force that the rotating blades 93 and 94 impart on the mixture of polymer and plasticizing agent or other lower viscosity fluid drives the mixture in an outward radial direction and into contact with the fixed cutting blades 99. The particles of polymer and plasticizing agent or other lower viscosity fluid are further cut and vigorously mixed when they radially and angularly decelerate upon contacting fixed cutting blades 99.

When the mixer is used to mix a polymer and plasticizing agent with another lower viscosity fluid, the continued introduction of the mixture of polymer and plasticizing agent pushes the highly sheared mixture of polymer and plasticizing agent between the fixed cutting blades 99 further into the first mixing zone 85. As best seen in FIGS. 2 and 5, breaker bars 103 on rotor 28 are arranged in a spiral fashion so as to impel the mixture of polymer and plasticizing agent further into the inwardly tapering conical annular space of the first mixing zone. Breaker bars 103 also serve to wipe the walls of stator 47. Additional breaker bars 104 are fixed on the stator 47. Fixed breaker bars 104 wipe the surface of rotor 28 so as to prevent polymer from building up on the rotor. Breaker bars 103 and 104 also cooperate to further shear the mixture of polymer and plasticizing agent passing through first mixing zone 85 and to break up any strands of polymer that might be present in the first mixing zone.

Mixing turbulence in the area of breaker bars 103 and 104 is increased by the tendency of the rotating fluid mixture to resist moving toward the outlet of the first mixing zone. Centrifugal forces on the rotating fluid and an increasing pressure gradient, due to the reduction in total cross-sectional area of the mixing zone as the zone tapers, both contribute to this flow resistance. Screw threads 89, at the end of the first mixing zone increase the pressure of the fluid mixture as the mixture is pumped from the first mixing zone to the second mixing zone. Threads 89 also serve to resist channeling of a low viscosity plasticizing agent or other lower viscosity fluid through the mixer. Such channeling, know as "splash out" in the art, is especially troublesome in the mixing of fluids with widely different viscosities.

According to the preferred embodiment of the invention, the mixture of polymer and plasticizing agent or other lower viscosity fluid mixed in the first mixing zone enters the second mixing zone 86 through a plurality of small orifices. As shown schematically in FIG. 2, the mixture from the first mixing zone passes to the second mixing zone through a plurality of passages 106. The mixture is prevented from passing between the first and second mixing zones along the surface of rotor 28 by the fluid seal 109. In the preferred embodiment of the invention shown in FIGS. 15 and 16, passages 106 comprise 25 sets of five holes spaced around the circumference of a second ring-shaped part 105 (best shown in FIG. 16). Each hole 106 has a diameter of about 1 mm and is drilled at an angle of about 60° from the rotational axis of rotor 28. The second ring-shaped part 105 is attached to the inside of sleeve 45 by screws 108.

In the preferred embodiment of the invention, the lower viscosity fluid enters the mixer 27 through an inlet 25 (shown in FIG. 14) screwed into pressure vessel lid 38, passes through a fluid inlet passage 23 in lid 38 (best shown in FIGS. 2 and 14), passes through a channel 48 in sleeve 45 (FIGS. 2 and 14), through a connecting passage 102 in ring-shaped part 105 (FIGS. 4 and 16), to an annular chamber 24 in ring-shaped part 105 (FIG. 16) from which the fluid is injected into the second mixing zone through twenty-five inlet orifices 107. Ring member 75 creates a dead end at the end of fluid inlet passage 23 such that injected fluid is directed into the sleeve passage 48. Multiple parallel sleeve passages in sleeve 45 can be used to improve heat transfer between the mixer and the lower viscosity fluid. Inlet orifices 107 communicate with annular chamber 24 through twenty-five bore holes 110 drilled in the ring-shaped part 105 in a direction parallel to the rotational axis of rotor 28 and interspersed between the twenty-five sets of passages 106. The inlet orifices 107 are preferably spaced at varying distances from the bore hole entrances such that the lower viscosity fluid is injected into the second mixing zone along the length of the rotating mixing blades 111 and 112 in the second mixing zone. In the preferred embodiment of the invention, bore holes 110 have a diameter of about 3.0 mm and inlet orifices 107 have a diameter of about 0.22 mm. A small amount of the lower viscosity fluid (less than 10% of the total amount of lower viscosity fluid entering the mixer) may also enter the first mixing zone 85 as cooling fluid for shaft 39 by way of first mixing zone screw threads 88.

According to the preferred embodiment of the invention, rotatable and fixed cutting blades in the second mixing zone are provided for vigorously cutting and mixing the polymer mixture entering second mixing zone 86 through passages 106 with the lower viscosity fluid entering the second mixing zone through orifices 107. As shown in FIGS. 2 and 4, rotatable cutting blades 111 and 112 extend from the rotor in a direction parallel to the rotational axis of rotor 28 into an annular groove in ring-shaped part 105 between holes 106 and fixed cutting blades 113. Rotatable cutting blades 111 and 112 and fixed cutting blades 113 are preferably made and arranged like the cutting blades 93, 94 and 99 in the first mixing zone, as described above with reference to FIGS. 5–7. When the mixture is used to generate a dispersion of polymer and a lower viscosity fluid, polymer, plasticizing agent, and lower viscosity fluid that enter the second mixing zone are immediately cut by the rotating blades 111 and 112 into tiny particles. The rotating blades accelerate the particles angularly and radially such that the particles are driven into contact with other particles. The particles of polymer, plasticizing agent and lower viscosity fluid are further cut and vigorously mixed when they decelerate upon contacting fixed cutting blades 113.

In an alternative embodiment of the invention, cutting blades 111 and 112 in the second mixing zone may be replaced with the rotor slots similar to the slots shown in FIG. 17. In another alternative embodiment of the invention, a slotted rotor could be used in place of the rotating cutting blades 92 in the first mixing zone.

The continued introduction into the second mixing zone of the mixture of polymer and plasticizing agent or other lower viscosity fluid from the first mixing zone and of lower viscosity fluid from outside the mixer pushes the highly sheared mixture between the fixed cutting blades 113 further into the second mixing zone 86. As shown in FIGS. 2 and 4, breaker bars 115 and 116, similar to breaker bars 103 and 104 in the first mixing zone 85, cooperate to further shear the mixture of polymer, plasticizing agent and lower viscosity fluid passing through second mixing zone 86, to prevent polymer buildup by wiping the walls of the second mixing zone, and to break up any strands of polymer that might be present in the second mixing zone. As in the first mixing zone, mixing turbulence in the area of breaker bars 115 and 116 is increased by the tendency of the rotating fluid mixture to resist moving toward the outlet of the first mixing zone. Centrifugal forces generated by the rotating fluid and an increasing pressure gradient, due to the reduction in total cross-sectional area of the second mixing zone as the zone tapers, both contribute to this flow resistance. Screw threads 90, at the end of the second mixing zone increase the pressure of the fluid mixture as the mixture is pumped from the second mixing zone to the third mixing zone. Threads 90 also serve to resist channeling of a low viscosity plasticizing agent or the lower viscosity fluid through the mixer.

When the mixer is used to generate a very fine homogenous dispersion of polymer, plasticizing agent and lower viscosity fluid, such a dispersion can be achieved by the end of the second mixing zone. If the mixer is used to mix a polymer and a polymer solvent, the mixture exiting the second mixing zone should be a polymer in solution. According to the preferred embodiment of the invention, a third mixing zone is provided for refining the polymer mixture. As shown in FIG. 4, the mixture of polymer, plasticizing agent and the lower viscosity fluid enters the third mixing zone 87 through a plurality of narrow slots 117 in a cylindrically-shaped extension 119 of stator 47. In an alternative embodiment of the invention, slots 117 may be replaced with 36 rows of nine 1.7 mm diameter holes (similar to holes 83 in FIG. 11) in extension 119. The mixture is prevented from passing between the second and third mixing zones along the surface of rotor 28 by the fluid seal 114. Upon exiting the slots 117, the mixture comes into contact with the slotted cylindrically-shaped extension 120 on rotor 28 that is best shown in FIG. 17. The clearance between the exit from slots 117 and the entrance to slots in rotating cylinder extension 120 is preferably less than 0.8 mm. Each of the slots 117 are preferably about 25 mm in length and about 1 mm in width. Similarly, each of the slots in rotating cylinder 120 are preferably about 25 mm in length and about 1 mm in width. In alternative embodiments of the invention, the slotted cylindrical extension 120 could be replaced by sets of cutting blades similar to those found in the first and second mixing zones.

After being angularly accelerated by rotating cylindrical extension 120, centrifugal force drives the mixture into contact with the outer fixed slotted cylinder 118 that extends in an axial direction from stator 47. The clearance between the exit from the slots in rotating inner cylinder 120 and the entrance to the slots in the fixed outer cylinder 118 is preferably less than 0.8 mm. Each of the slots in fixed outer cylinder 118 is preferably about 25 mm in length and about 1 mm in width. The angular deceleration that occurs when the mixture contacts fixed outer cylinder 118 induces further mixing of the mixture such that the dispersion is made finer and more homogeneous.

In the preferred embodiment of the invention, the continuing flow of the mixture of polymer and lower viscosity fluid through the mixer and the radial momentum of the mixture serve to push the mixture through the slots in the fixed cylindrical member 118 and into contact with the slotted rotating outer cylinder 121. The clearance between the exit from slots in the fixed outer cylinder 118 and the entrance to the slots in the rotating outer cylinder 121 is preferably less than 0.8 mm. Each of the slots in rotating outer cylinder 121 is preferably about 25 mm in length and about 1 mm in width. Inner and outer rotating cylindrical members 120 and 121 rotate with the rotor 28, preferably at an angular velocity of between about 600 and 1200 rpm. The rotating outer cylinder 121 angularly accelerates the dispersion so as to induce still more mixing. Rotation of the outer cylinder 121 imposes a centrifugal force on the dispersion that drives the dispersion in an outward radial direction toward the sleeve 45. In the preferred embodiment of the invention, the fixed slotted cylindrical extensions 118 and 119 and the rotating slotted cylinders 120 and 121 are made of stainless steel, as for example SST316L. The continuing flow of mixture through the mixer and a helical screw thread 124 on the outside of outer cylinder 121 combine to further agitate the dispersion and push the dispersion further into the third mixing zone 85.

Breaker bars 126 on rotor 28 are arranged in a spiral fashion so as to assist in impelling the mixture of polymer and lower viscosity fluid further into the inwardly tapering conical mixing space of the third mixing zone. Breaker bars 126 and the helical screw threads 124 also serve to wipe the inside walls of sleeve 45. Additional breaker bars 127 are fixed on the sleeve 45. Fixed breaker bars 127 wipe the surface of rotor 28 so as to prevent polymer from building up on the rotor. Breaker bars 126 and 127 also cooperate to further shear the mixture of polymer and lower viscosity fluid passing through third mixing zone 87 and to break up any accumulations of polymer, plasticizing agent or lower viscosity fluid that might form in the third mixing zone. Mixing turbulence in the vicinity of breaker bars 126 and 127 is increased by the tendency of the rotating fluid mixture to resist moving toward the mixer outlet 41. Centrifugal forces of the rotating dispersion and an increasing pressure gradient, due to the reduction in total cross-sectional area of the mixing zone as the zone tapers to mixer outlet 41, both contribute to this flow resistance and associated turbulence.

In the preferred embodiment of the invention, mixer outlet 41 has a diameter of about 9.0 mm and is made of stainless steel. The mixture of polymer and lower viscosity fluid passes from third mixing zone 87 to outlet 41 through a plurality of passages 130. In the preferred embodiment of the invention, passages 130 comprise eight 3.5 mm diameter passages. Mixer outlet 41 is preferably located in the tip of a short piece of externally threaded pipe 42 that is screwed into the end of pressure vessel 37. Pipe 42 should include a coupling, as for example the threads 49 shown in FIG. 4, for connecting mixer outlet 41 to a transfer line. As shown in FIG. 1, transfer line 40 may be used to transport a polymer dispersion or polymer solution to a flash spinning operation or other desired location.

In alternative embodiments of the invention, the third mixing zone could be used for adding another fluid to the mixture in a manner similar to the mixing process that takes place in the second mixing zone. Alternatively, the second and third mixing zones could be eliminated entirely if a desired mixture of polymer and lower viscosity fluid can be attained with just one or two mixing zones. Likewise, additional mixing zones, similar to the second or third mixing zones could be added to the mixer, if required for adding additional materials to the mixture or for further mixing and refining of the mixture.

The mixer of the invention has been described for use primarily in the generation of uniform dispersions of immiscible fluids, such as a polymer and water. However, it is contemplated that the mixer could also be used to generate mixtures of polymers in solution. It is known in the art that the shear stress required to make a solution of two miscible materials is significantly less than shear stress required to generate a fine homogeneous dispersion of immiscible materials such as most polymers and water. It is also contemplated that the mixer or the invention can be used to generate solutions of polymers and fluids that are solvents for the polymers at autogenous pressure. The mixer of the invention would also be useful in generating mixtures of materials with very different physical properties that behave as if immiscible until initial mixing and dissolution brings their properties closer together.

EXAMPLES

Equipment

A mixer, as shown in the drawings and described above, was used in the following non-limiting examples which are intended to illustrate the invention and not to limit the invention in any manner. The volume of the mixer's mixing chamber between the point where the polymer first contacts $CO_2$ plasticizing agent and the mixer outlet was 495 $cm^3$. The volume of the mixer's polymer path upstream of the point where polymer first contacts $CO_2$ was 553 $cm^3$. The volume of the mixer's plasticizing agent and lower viscosity fluid paths upstream of the mixing chamber were each 10 $cm^3$. The pressure vessel of the mixer was rated to withstand a working pressure of 41,000 kPa. Polymer was injected into the mixer by a polymer screw extruder and gear pump as described above. Supercritical $CO_2$ plasticizing agent from a pressurized storage tank and distilled water from a closed storage tank were both injected into the mixer by double acting piston pumps, as described above. A dispersion of polymer, $CO_2$ and water was generated by the mixer and was flash spun through a spin orifice into a zone maintained at atmospheric pressure and room temperature. The spin products were collected on a moving belt from which samples were removed for examination and testing.

Spin Product Test Procedures

Tenacity and elongation of the flash-spun strand are determined with an Instron tensile-testing machine. The strands are conditioned and tested at 70° F. and 65% relative humidity. The strands are then twisted to 10 turns per inch and mounted in the jaws of the Instron Tester. A two-inch gauge length was used and initial elongation rate was 4 inches per minute. The tenacity at break is recorded in grams per denier (gpd).

The denier of the strand is determined from the weight of a 15 cm sample length of strand.

In the non-limiting examples that follow, all parts and percentages are by weight unless otherwise indicated.

EXAMPLE 1

The polymer injected into the mixer was a blend of ALATHON® H6018 and SELAR® OH BX240. ALA- THON® H6018 is a high density polyethylene that was obtained from Occidental Chemical Corporation of Houston, Tex. ALATHON® is currently a registered trademark of Lyondell Petrochemical Company of Houston, Tex. The ALATHON® H6018 had a melt flow rate of 17.5 g/10 min by standard techniques at a temperature of 190° C. with a 2.16 Kg weight, and had a melting point of 130°–135° C. The SELAR® OH BX240 was obtained from E. I. du Pont de Nemours and Co. of Wilmington, Del. SELAR® is a registered trademark of DuPont. SELAR® OH BX240 is a melt-blended, pelletized polymer consisting of 90% SELAR® OH 4416 and 10% FUSABOND™ E MB-259D, both polymers being obtained from E. I. du Pont de Nemours and Co. of Wilmington, Del. SELAR® OH 4416 is an ethylene vinyl alcohol copolymer having 44 mole % ethylene units, a melt flow rate of 16.0 g/10 min by standard techniques at a temperature of 210° C. with a 2.16 kg weight, and a melting point of 168° C. FUSABOND™ E MB-259D is a polyethylene grafted with 0.2–0.3% maleic anhydride, it has a melt flow rate of 20–25 g/10 min by standard techniques at a temperature of 190° C. with a 2.16 kg weight, and has a melting point of 120°–122° C. FUSABOND™ is a trademark of DuPont.

A polymer blend of 90% ALATHON® H6018 and 10% SELAR® OH BX240 was extruded and injected into the mixer during a first mixing period that lasted 1 hour and 53 minutes. The polymer blend was plasticized with supercritical $CO_2$ and mixed with water as described above. Without shutting down the mixing process, the polymer input was changed to a blend of 75% ALATHON® H6018 and 25% SELAR® OH BX240 for a second 22 minute mixing period. Again, without shutting down the mixing process, the polymer input was changed back to a blend of 90% ALATHON® H6018 and 10% SELAR® OH BX240 for a third 17 minute mixing period. During all three mixing periods a 200 micron filter was placed in the transfer line between the mixer outlet and a 0.08 cm spin orifice. The filter was rated to block passage of particles with a width greater than 200 microns or a length greater than 400 microns.

The process parameters and a description of the products produced during each of the three mixing periods are set forth below.

TABLE 1

First Mixing Period:

| Ingredient Injection Condition (1st Period) | Average Injection Temperature (°C.) | Average Injection Pressure (kPa) | Range of Injection Rates (Kg/hr) | Calculated Viscosity (cp) |
|---|---|---|---|---|
| Polymer | 220 | 35,160 | 38–52 | 450,000 |
| $CO_2$ | 220 | 30,340 | 45–65 | 0.06 |
| Water | 220 | 31,025 | 24–58 | 0.12 |

| | | | | |
|---|---|---|---|---|
| Average Ratio - $CO_2$/Polymer: | 1.2 | | Average polymer time in mixing chamber: | 11 sec |
| Average Ratio - Water/polymer: | 0.9 | | | |
| Pressure - Zone 1: | 30,340 kPa | | Rotor spin rate: | 1200 rpm |
| Pressure - Zone 2: | 31,025 kPa | | Average power consumption: | 8.0 kW |
| Pressure - Zone 3: | 28,270 kPa | | | |
| Pressure - Spin Orifice: | 28,720 kPa | | Average Torque: | 63.3 N-m |
| Avg. Mixer Body Temp.: | 210° C. | | | |

Products: A collapsed tubular web of finely fibrillated, soft plexifilamentary strands was obtained. The web was 30 to 40 cm wide with occasional holes and breaks. The web had a tex of approximately 100 and the web's tenacity was approximately 0.6 gpd. No build-up of polymer was observed at the 200 micron filter.

TABLE 2

Second Mixing Period:

| Ingredient Injection Condition (2nd Period) | Average Injection Temperature (°C.) | Average Injection Pressure (kPa) | Range of Injection Rates (Kg/hr) | Calculated Viscosity (cp) |
|---|---|---|---|---|
| Polymer | 220 | 30,335 | 41–49 | 450,000 |
| $CO_2$ | 220 | 30,335 | 52–62 | 0.06 |
| Water | 230 | 29,305 | 39–56 | 0.12 |

| | | | | |
|---|---|---|---|---|
| Average Ratio - $CO_2$/polymer: | 1.25 | | Average polymer time in mixing chamber: | 11 sec |
| Average Ratio - Water/polymer: | 1.05 | | | |
| Pressure - Zone 1: | 30,335 kPa | | Rotor spin rate: | 1200 rpm |
| Pressure - Zone 2: | 29,305 kPa | | Average power consumption: | 7.5 kW |
| Pressure - Zone 3: | 28,270 kPa | | | |
| Pressure - Spin Orifice: | 28,960 kPa | | Average Torque: | 59.7 N-m |
| Avg. Mixer Body Temp.: | 210° C. | | | |

Products: A collapsed tubular web of finely fibrillated, soft plexifilamentary strands was obtained. The web was 30 to 40 cm wide with larger holes and breaks than were observed during the first mixing period. The web had a tex of approximately 100 and the web's tenacity was approximately 0.5 gpd. No build-up of polymer was observed at the 200 micron filter.

TABLE 3

Third Mixing Period:

| Ingredient Injection Condition (3rd Period) | Average Injection Temperature (°C.) | Average Injection Pressure (kPa) | Range of Injection Rates (Kg/hr) | Calculated Viscosity (cp) |
|---|---|---|---|---|
| Polymer | 220 | 34,645 | 41 | 450,000 |
| $CO_2$ | 220 | 29,305 | 57–58 | 0.06 |
| Water | 230 | 30,335 | 36 | 0.12 |

| | | | | |
|---|---|---|---|---|
| Average Ratio - $CO_2$/polymer: | 1.3 | | Average polymer time in mixing chamber: | 11 sec |
| Average Ratio - Water/polymer: | 0.75 | | | |
| Pressure - Zone 1: | 29,305 kPa | | Rotor spin rate: | 1200 rpm |
| Pressure - Zone 2: | 30,335 kPa | | Average power consumption: | 7.5 kW |
| Pressure - Zone 3: | 28,270 kPa | | | |
| Pressure - Spin Orifice: | 28,615 kPa | | Average Torque: | 62.0 N-m |
| Avg. Mixer Body Temp.: | 240° C. | | | |

Products: A collapsed tubular web of finely fibrillated, soft plexifilamentary strands was obtained. The web was 30 to 40 cm wide with holes and breaks like those in the first mixing period. The web had a tex of approximately 100 and the web's tenacity was approximately 0.6 gpd. No build-up of polymer was observed at the 200 micron filter.

EXAMPLE 2

The polymer injected into the mixer was a blend of ALATHON® 7050 and SELAR® OH BX240. ALATHON® 7050 is a high density polyethylene that was obtained from Occidental Chemical Corporation of Houston, Tex. The ALATHON® 7050 had a melt flow rate of 17.5 g/10 min by standard techniques at a temperature of 190° C. with a 2.16 Kg weight, and had a melting point of 130°–135° C.

A polymer blend of 90% ALATHON® 7050 and 10% SELAR® OH BMX240 was extruded and injected into the mixer during a mixing period that lasted 1 hour and 50 minutes. The calculated viscosity of the polymer blend injected into the mixer was approximately 450,000 cp. The polymer blend was plasticized with supercritical $CO_2$ and mixed with water as described above. Without shutting down the mixing process, the ratios of polymer to $CO_2$ and polymer to water were periodically changed. During the entire mixing period, a 10 micron filter was placed in the transfer line between the mixer outlet and the spin orifice. The filter was rated to block passage of particles with a width greater than 10 microns or a length greater than 20 microns. Process parameters for the nine phases of the 1 hour and fifty minute mixing period are set forth in Table 4 below.

periods, each with 4 phases. The first mixing period lasted 27 minutes and the second mixing period lasted 30 minutes. During mixing, the polymer was plasticized with supercritical $CO_2$ and was mixed with water as described above. The second mixing period (phases 5–8) differed from the first mixing period (phases 1–4) in that during the second period FLUORAD™ surfactant was mixed into the water at 1% by weight before being injected into the mixer.

Valtec HH444 is polypropylene obtained from Himont Corporation of Wilmington, Del. Valtec HH444 has a melt flow rate of 70 g/10 min by standard techniques at a temperature of 190° C. with a 2.16 kg weight, and has a melting point of 170° C. The calculated viscosity for the Valtec HH444 injected into the mixer was approximately 100,000 cp. FLUORAD™ is a cationic surfactant manufac-

TABLE 4

| | | | | | | | |
|---|---|---|---|---|---|---|---|
| | | Mixer speed: 1200 rpm | | Spin Orifice Diameter: .0175 cm | | | |
| | | Mixer power: 7.26–8.1 kW | | Mixer lid temperature: 210° C. | | | |
| Test Phase | Duration (min) | Polymer Inj. Rate (kg/hr) | $CO_2$ Inj. Rate (kg/hr) | Water Inj. Rate (kg/hr) | $CO_2$ to Polymer Ratio | Water to Polymer Ratio | Pressure @ Mixer Outlet (kPa) |
| 1 | 14 | 36 | 32 | 16 | .9 | .45 | 23,790 |
| 2 | 9 | 41 | 35 | 10 | .85 | .25 | 24,480 |
| 3 | 10 | 36 | 35 | 8 | 1.0 | .25 | 23,100 |
| 4 | 10 | 42 | 41 | 11 | .95 | .25 | 26,200 |
| 5 | 22 | 44 | 35 | 20 | .8 | .45 | 26,540 |
| 6 | 17 | 51 | 35 | 16 | .7 | .30 | 26,890 |
| 7 | 5 | 54 | 33 | 16 | .6 | .30 | 26,890 |
| 8 | 7 | 56 | 30 | 15 | .55 | .25 | 27,230 |
| 9 | 17 | 59 | 30 | 15 | .5 | .25 | 26,890 |

Products: During all phases of the mixing period, a web of multiple bundles of very fine plexifilamentary fiber strands of 2 to 10 meters in length were spun and laid down to form billowy loose batts. No build-up of polymer was observed at the 10 micron filter. The individual strands were tape-like in appearance with occurrence of stuck or tangled fibers every 2 to 10 cm.

EXAMPLE 3

A polymer of 100% Valtec HH444 polypropylene was extruded and injected into the mixer during two mixing tured by 3M Corporation of St. Paul, Minn. FLUORAD™ is a trademark of 3M Corporation.

The ratios of polymer to $CO_2$ and polymer to water were periodically changed with each new phase during the mixing periods. The pressure of the dispersion at the outlet of the mixer also changed with each mixing phase. During all mixing phases, a 200 micron filter was placed in the transfer line between the mixer outlet and the spin orifice. The filter was rated to block passage of particles with a width greater than 200 microns or a length greater than 400 microns. Process parameters for the mixing phases are set forth in Table 5 below.

TABLE 5

| | | | | | | | |
|---|---|---|---|---|---|---|---|
| | | Mixer speed: 1200 rpm | | Spin Orifice diameter: 0.0787 cm | | | |
| | | Mixer power: 7.5–9.5 kW | | Mixer lid temperature: 225° C. | | | |
| Test Phase | Duration (min) | Polymer Inj. Rate (kg/hr) | $CO_2$ Inj. (kg/hr) | Water Inj. Rate (kg/hr) | $CO_2$ to Polymer Ratio | Water to Polymer Ratio | Pressure @ @ Mixer Outlet (kPa) |
| 1 | 5 | 60 | 73 | 30 | 1.2 | .5 | 26,545 |
| 2 | 5 | 59 | 78 | 78 | 1.3 | 1.3 | 28,165 |
| 3 | 7 | 82 | 57 | 57 | 0.7 | 0.7 | 23,440 |
| 4 | 10 | 102 | 41 | 41 | 0.4 | 0.4 | 19,305 |
| 5 | 7 | 54 | 71 | 71 | 1.3 | 1.3 | 28,270 |
| 6 | 9 | 85 | 60 | 60 | 0.7 | 0.7 | 23,270 |
| 7 | 7 | 99 | 39 | 39 | 0.4 | 0.4 | 19,305 |
| 8 | 7 | 57 | 68 | 48 | 1.2 | 0.85 | 28,960 |

Products: During all mixing phases, a dispersion was produced in the mixer and the dispersion was spun through the spin orifice into a chamber open to the atmosphere and at room temperature. No build-up of polymer was observed at the 200 micron filter. A soft, coarse, plexifilamentary fiber was spun from the spin orifice and was collected on a moving belt in the form of a thick, loosely layered sheet. The fiber had a twisted tenacity of 0.5–1.5 gpd. The fibers were in random lengths of 0.3 to 1.2 m with ribbon-like areas and were stuck loosely together in an open net-like web. The web was broken and discontinuous with holes ranging from 0.1 cm to the full 20 cm web width.

EXAMPLE 4

A blend of polymer pellets of 90% HYTREL® 6133 and 10% SELAR® OH BX240 was extruded and injected into the mixer during a total mixing period of forty-six minutes that was interrupted by three breaks. The calculated viscosity of the polymer blend injected into the mixer was approximately 250,000 cp. During mixing, the polymer was plasticized with supercritical $CO_2$ and mixed with water as described above.

HYTREL® 6133 is a melt spinnable polyester elastomer obtained from E. I. du Pont de Nemours and Co. of Wilmington, Del. HYTREL® is a registered trademark of DuPont. HYTREL® has a melt flow rate of 5.0 g/10 min by standard techniques at a temperature of 190° C. with a 2.16 kg weight, and it has a melting point in the range of 170°–190° C.

The polymer was plasticized with supercritical $CO_2$ and was mixed with water as described above. During testing, the ratios of polymer to $CO_2$ and polymer to water were periodically changed. The pressure of the dispersion at the outlet of the mixer also changed with each mixing phase. The mixing process was briefly interrupted twice due to failure of a $CO_2$ pump to provide sufficient pressure to sustain mixing and once due to failure of a PRD (pressure relieving device—a rupture disc). In each instance, mixing was continued after repairs were made and pressure was restored. During the entire mixing period, a 200 micron filter was placed in the transfer line between the mixer outlet and the spin orifice. The filter was rated to block passage of particles with a width greater than 200 microns or a length greater than 400 microns. Process parameters for the phases of the mixing period are set forth in Table 6 below.

Products: During all mixing phases, a polymer dispersion was produced in the mixer and was spun through the spin orifice into a chamber open to the atmosphere and at room temperature. No build-up of polymer was observed at the 200 micron filter. A fiber that was soft, coarse and plexifilamentary was produced. The fiber was collected on a moving belt in the form of a thick, loosely layered sheet. The fiber had a twisted tenacity of 0.5–1.5 gpd. The fibers were in random lengths of 0.3 to 1.2 m with ribbon-like areas and were stuck loosely together in an open net-like web. The web was broken and discontinuous with holes ranging from 0.1 cm to the full 20–30 cm web width.

It will be apparent to those skilled in the art that modifications and variations can be made in the mixer apparatus and process of this invention. The invention in its broader aspects is, therefore, not limited to the specific details, the representative apparatus or the illustrative example described above. Thus, it is intended that all matter contained in the foregoing description, drawings and example shall be interpreted as illustrative and not in a limiting sense.

We claim:

1. An apparatus for continuously generating a homogeneous mixture of substances of widely different viscosities, comprising:

a pressure vessel capable of sustaining a pressure of at least 7000 kPa;

means for continuously injecting a viscous polymer into said vessel;

means for continuously injecting a lower viscosity fluid into said pressure vessel, said viscous polymer having a viscosity at least 10,000 times greater than the viscosity of said lower viscosity fluid;

means for continuously injecting an agent into said viscous polymer entering the pressure vessel that both plasticizes the viscous polymer and reduces the interfacial tension between the viscous polymer and the lower viscosity fluid;

rotational mixing means disposed within said pressure vessel for mixing said polymer and said less viscous fluid;

drive means for rotating said rotational mixing means;

heating means for maintaining the temperature of the substances being mixed in said pressure vessel at a desired mixing temperature; and means for continuously discharging from said pressure vessel a homogeneous mixture of said polymer, said plasticizing agent, and said less viscous fluid.

TABLE 6

| | Mixer speed: 1200 rpm | | | Spin Orifice diameter: 0.0787 cm | | | |
|---|---|---|---|---|---|---|---|
| | Mixer power: 7.5–9.7 kw | | | Mixer lid temperature: 240 deg C. | | | |
| Test Phase | Duration (min) | Polymer Inj. Rate (kg/hr) | $CO_2$ Inj. (kg/hr) | Water Inj. Rate (kg/hr) | $CO_2$ to Polymer Ratio | Water to Polymer Ratio | Pressure @ Mixer Outlet (kPa) |
| 1 | 10 | 53 | 64 | 64 | 1.2 | 1.2 | 28,270 |
| Down | 17 | $CO_2$ pump | | | | | |
| 2 | 7 | 60 | 60 | 72 | 1.0 | 1.2 | 27,925 |
| Down | 33 | $CO_2$ pump | | | | | |
| 3 | 8 | 57 | 57 | 68 | 1.0 | 1.2 | 27,925 |
| 4 | 4 | 58 | 58 | 58 | 1.0 | 1.0 | 27,580 |
| Down | 18 | PRD failed | | | | | |
| 5 | 8 | 63 | 63 | 44 | 1.0 | 0.7 | 27,580 |
| 6 | 9 | 73 | 59 | 37 | 0.8 | 0.5 | 27,580 |

2. The apparatus of claim 1 wherein the viscosity of the polymer is in the range of 150,000 to 3,000,000 cp and the viscosity of the lower viscosity fluid is less than 10 cp.

3. The apparatus of claim 2 wherein:

said rotational mixing means comprises a rotor with a plurality of shearing blades extending therefrom in an outward direction; and said pressure vessel has an inner surface that defines a hollow space within which the rotor is rotatably disposed, said pressure vessel having a plurality of fixed cutting blades extending from said inner surface in an inward direction, the clearance between the cutting blades extending from the rotor and the fixed cutting blades being less than 5 mm.

4. The apparatus of claim 3 wherein the rotor rotates at more than 1000 revolutions per minute and with a torque of at least 55 newton meters during mixing.

5. The apparatus of claim 2 wherein said drive means comprises a shaft on which the rotor is mounted and a shaft drive means, said shaft and said rotor sharing the same rotational axis, said shaft being disposed entirely within said pressure vessel and being magnetically coupled to shaft drive means, said shaft drive means being disposed outside of the pressure vessel.

6. A mixer for continuously generating a mixture of a polymer and a lower viscosity fluid, comprising:

a pressure vessel capable of sustaining a pressure of at least 7000 kPa, said pressure vessel having a mixing zone therein;

a polymer injection port in the pressure vessel:

a plurality of polymer sprues connecting said polymer injection port and said mixing zone, said sprues each having a cross-sectional area of less than 100 mm$^2$;

means for injecting a first fluid into polymer passing through said polymer sprues;

rotational mixing means disposed within said pressure vessel for mixing the polymer and first fluid in said mixing zone;

a rotatable sleeve rotatably mounted on the outside of the pressure vessel and having a rotational axis that corresponds to the rotational axis of the rotational mixing means, said rotatable sleeve being magnetically coupled to the rotational mixing means;

drive motor means coupled to said rotatable sleeve for rotating said sleeve and rotational mixing means;

heating means for maintaining the temperature of the polymer and first fluid being mixed in said pressure vessel at a desired mixing temperature; and means for continuously discharging a homogeneous mixture of said polymer and said first fluid from said pressure vessel.

7. The mixer of claim 6 wherein:

said rotational mixing means comprises a rotor, said rotor being disposed in a hollow space within the pressure vessel defined by an inner wall of the pressure vessel, the rotor and inner wall of the pressure vessel defining an annular mixing space in which said mixing zone is located;

said polymer sprues connect said polymer injection port to a polymer inlet chamber located within the pressure vessel and the polymer inlet chamber connects to the mixing zone through a plurality of polymer injection orifices of less than 2.0 mm diameter; and said rotor has a plurality of cutting blades in said mixing zone, said cutting blades having cutting edges extending therefrom, the rotor being configured within the hollow space of the pressure vessel such that the cutting edges of the cutting blades pass across the outlets of the polymer injection orifices that open into the mixing zone when the rotor rotates, the clearance between the outlets of the polymer injection orifices and said cutting blades being less than 2 mm, and said rotor is capable of turning at a rate of at least 1000 revolutions per minute during mixing.

8. The mixer of claim 7 wherein the wall of each of said sprues has a plurality of injection holes through which said first fluid can be injected into polymer passing through the sprue.

9. The mixer of claim 8 wherein:

the cutting blades on said rotor extend into a first annular groove in the inner wall of the pressure vessel, said pressure vessel inner wall defining first and second opposing surfaces of the first annular groove;

the outlets of said polymer injection orifices are located on the first surface of the annular groove, said outlets being spaced around the circumference of the first surface of the first annular groove; and a first plurality of fixed cutting blades are mounted on the second surface of the first annular groove, the clearance between the cutting blades on the rotor and the fixed cutting blades being less than 2 mm, whereby polymer and the first fluid entering said mixing zone through the polymer injection orifices is sheared and mixed by the rotating blades and is further sheared and mixed by the first plurality of fixed cutting blades.

10. The mixer of claim 7 wherein said pressure vessel has a second fluid port for injecting a second fluid into the mixing zone.

11. The mixer of claim 10 wherein said mixing zone includes first and second interconnected mixing zones disposed sequentially within said pressure vessel, the outlets of said polymer injection orifices being in said first mixing zone and wherein the second fluid injection port injects the second fluid into said second mixing zone.

12. The mixer of claim 11 wherein said rotor rotates in both of said first and second mixing zones and said drive means comprises a shaft on which the rotor is mounted such that the shaft and the rotor share the same rotational axis, the shaft is disposed entirely within said pressure vessel, and the shaft is magnetically coupled to the rotatable sleeve on the outside of the pressure vessel.

13. The mixer of claim 12, further comprising:

first mixing zone pump means for further mixing the polymer and first fluid, for compressing the mixture of polymer and first fluid, and for propelling the mixture of polymer and first fluid from said first mixing zone to said second mixing zone; and pressure regulation means for maintaining the pressure in said pressure vessel at greater than 7380 kPa during mixing.

14. The mixer of claim 13 wherein the magnetic coupling and shaft can transfer a maximum torque of at least 40 Nm to said rotor during mixing and the ratio of said maximum torque to the annular mixing space of the mixer is at least 50,000 N-m/m$^3$.

15. The mixer of claim 13, further comprising:

a second annular groove in the inner wall of the pressure vessel in the second mixing zone, said pressure vessel inner wall defining first and second opposing surfaces of said second annular groove;

a second plurality of cutting blades on the rotor with cutting edges extending therefrom, the second plurality of cutting blades being positioned on the rotor to rotate in the second annular groove of the second mixing zone;

a plurality of passages through which the mixture of polymer and first fluid is propelled from the first mixing zone to the first surface of the second annular groove, each of said passages having an outlet in the first surface of the second annular groove, said outlets being spaced around the circumference of said first surface of said second annular groove;

a plurality of second fluid injection orifices in communication with said second fluid injection port through which said second fluid entering the pressure vessel through said second fluid port is injected into said second mixing zone, said second fluid injection orifices having outlets in the first surface of the second annular groove, said outlets being spaced around the circumference of said first surface of said second annular groove and being interspersed among the outlets of the passages from the first mixing zone;

a second plurality of fixed cutting blades mounted along the second surface of the second annular groove, the clearance between the second plurality of cutting blades on the rotor and the first surface of the second annular groove being less than 2 mm, and the clearance between the second plurality of cutting blades on the rotor and the second plurality of fixed cutting blades being less than 2 mm;

whereby the second fluid injected through the second fluid injection orifices and the mixture of polymer and first fluid entering the second mixing zone from the first mixing zone is sheared and mixed by the second plurality of rotating cutting blades and the mixture is further sheared and mixed upon contact with the second plurality of fixed cutting blades on the second surface of the second annular groove before being discharged from said pressure vessel.

16. In an apparatus for spinning polymer fibrils out of a spinning orifice from a dispersion of polymer, water and carbon dioxide, a mixer comprising:

a pressure vessel capable of sustaining a pressure of at least 24000 kPa, said pressure vessel having first and second mixing zones disposed sequentially therein;

polymer melt injection means for continuously injecting into the first mixing zone of said pressure vessel a viscous polymer melt;

means for injecting carbon dioxide at a pressure greater than 20,000 kpa into said polymer entering said pressure vessel before the polymer is introduced into the first mixing zone;

rotational mixing means disposed within said first mixing zone of said pressure vessel for mixing the polymer melt and carbon dioxide in said first mixing zone, and for propelling the mixture of the polymer melt and carbon dioxide from said first mixing zone to said second mixing zone;

means for injecting water into said mixture of polymer melt and carbon dioxide propelled from said first mixing zone into the second mixing zone;

said rotational mixing means further including means in said second mixing zone for mixing said polymer melt, carbon dioxide and water into a homogeneous dispersion;

heating means for maintaining the temperature of the substances being mixed in said pressure vessel at a desired mixing temperature;

means for maintaining the pressure of the mixture within the pressure vessel above 20,000 kPa; and means for continuously discharging the homogeneous dispersion of said polymer, carbon dioxide and water from said pressure vessel to the spinning orifice.

17. The mixer of claim 16 further comprising a third mixing zone disposed in said pressure vessel downstream of said first and second mixing zones, wherein said rotational mixing means includes means for propelling the mixture of polymer, carbon dioxide and water from said second mixing zone to said third mixing zone, and includes means for further mixing the dispersion of polymer, carbon dioxide and water in the third mixing zone before said mixture is discharged from said pressure vessel.

18. The mixer of claim 17 wherein the rotational mixing means reduces the average diameter of water droplets in the dispersion discharged from said pressure vessel to less than three fourths of the diameter of the spinning orifice through which polymer fibrils are spun.

19. The mixer of claim 18 wherein the average diameter of water droplets in the dispersion discharged from said pressure vessel is less than 150 microns.

20. A process for continuously generating in a pressure vessel a homogeneous mixture of a viscous polymer and a less viscous fluid:

a) continuously injecting a viscous polymer melt into said pressure vessel;

b) continuously injecting a plasticizing agent into said viscous polymer melt entering the pressure vessel;

c) maintaining the temperature of the pressure vessel at a desired mixing temperature;

d) mixing said polymer melt and plasticizing agent in a first mixing zone of said pressure vessel;

e) propelling said mixture of polymer melt and plasticizing agent to a second mixing zone;

f) adding a lower viscosity fluid to the mixture of polymer melt and plasticizing agent propelled from said first to said second mixing zone, said lower viscosity fluid having a viscosity at least 20,000 times less than the viscosity of the polymer injected into the pressure vessel;

g) mixing the polymer, the plasticizing agent and the lower viscosity fluid in the second mixing zone to form a homogeneous mixture;

h) continuously discharging the homogeneous mixture of said polymer, plasticizing agent and lower viscosity fluid from said pressure vessel.

* * * * *